United States Patent
Oishi

Patent Number: 5,124,841
Date of Patent: Jun. 23, 1992

[54] POLARIZATION FORMING OPTICAL DEVICE AND POLARIZATION BEAM SPLITTER

[75] Inventor: Noriji Oishi, Aichi, Japan

[73] Assignee: Mitsubishi Rayon Co., Ltd., Tokyo, Japan

[21] Appl. No.: 597,819

[22] Filed: Oct. 15, 1990

[30] Foreign Application Priority Data

| Oct. 13, 1989 | [JP] | Japan | 1-265112 |
| Nov. 15, 1989 | [JP] | Japan | 1-294899 |
| Nov. 16, 1989 | [JP] | Japan | 1-298122 |
| Jun. 4, 1990 | [JP] | Japan | 2-144528 |
| Jun. 28, 1990 | [JP] | Japan | 2-168246 |

[51] Int. Cl.⁵ .......... G02B 5/04; G02B 5/30; G02B 27/28
[52] U.S. Cl. .......... 359/487; 359/495; 359/496
[58] Field of Search .......... 350/394, 401, 402, 286; 359/487, 495, 496

[56] References Cited

U.S. PATENT DOCUMENTS

| 2,748,659 | 6/1956 | Geffcken et al. | 350/401 |
| 3,510,198 | 5/1970 | Pace | 359/496 |
| 3,563,633 | 2/1971 | Mauer | 359/496 |
| 3,876,285 | 4/1975 | Schwarzmuller | 350/401 |
| 4,502,783 | 3/1985 | Lau et al. | 359/496 |
| 4,741,588 | 5/1988 | Nicia et al. | 350/402 |
| 4,798,448 | 1/1989 | van Raalte | |
| 4,804,264 | 2/1989 | Kirchhofer et al. | 350/401 |
| 4,948,229 | 8/1990 | Soref | 350/96.14 |

FOREIGN PATENT DOCUMENTS

| 63-168622 | 7/1988 | Japan |
| 63-19791 | 8/1988 | Japan |
| 63-271313 | 11/1988 | Japan |
| 743502 | 1/1956 | United Kingdom |

Primary Examiner—Bruce Y. Arnold
Assistant Examiner—Martin Lerner
Attorney, Agent, or Firm—Baker & Daniels

[57] ABSTRACT

An optical device for forming a linear polarized light by dividing a light beam from a light source into two linear polarized light components, and rotating a plane of polarization of one of the light components at 90° to follow joining of both the light components. Further, a polarization beam splitter for dividing a light beam into two linear polarized light components is employed in such an optical device.

19 Claims, 39 Drawing Sheets

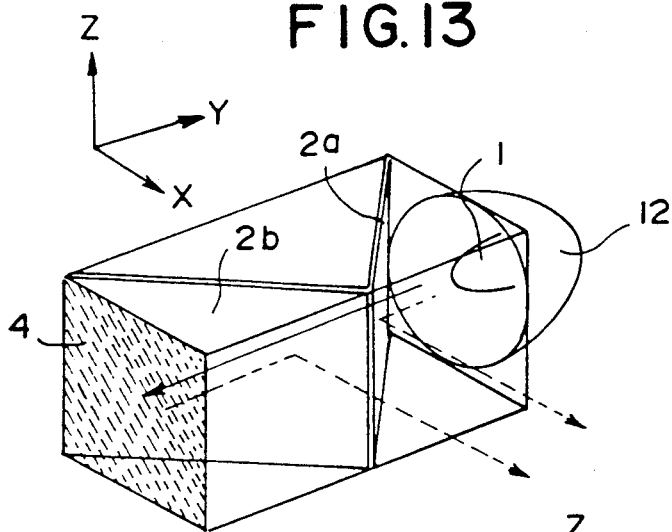
FIG. 13
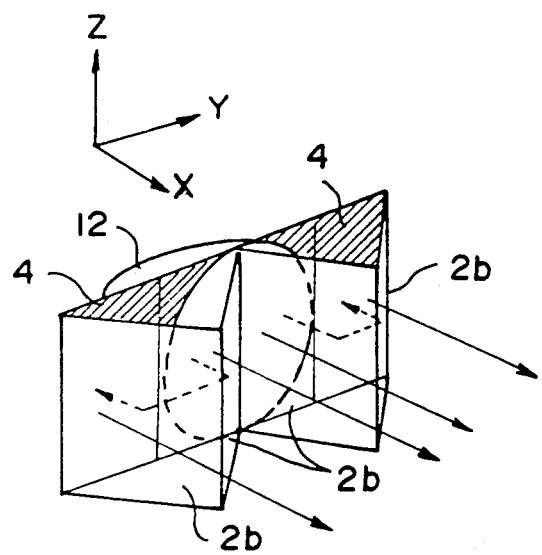
FIG. 14
FIG. 15
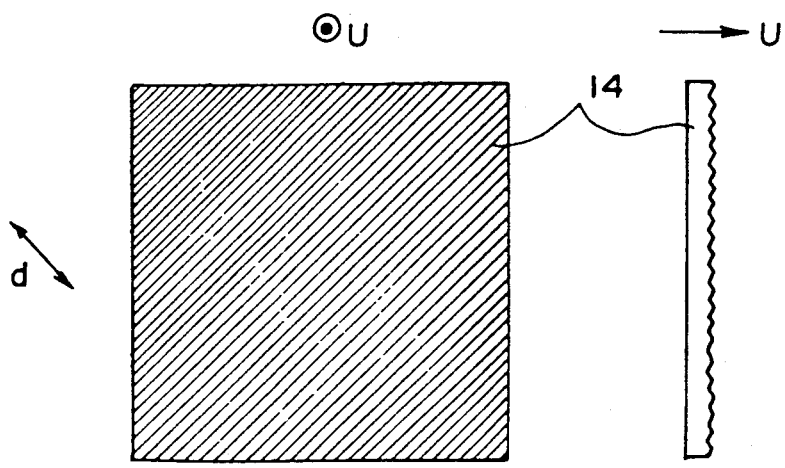

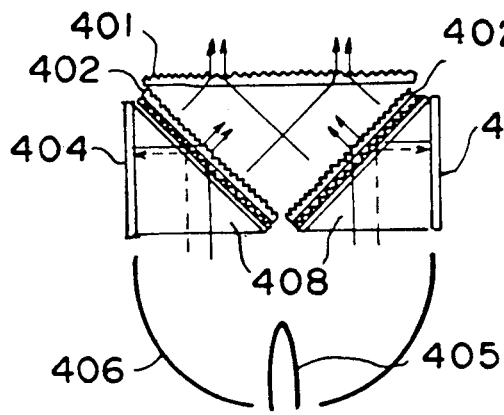
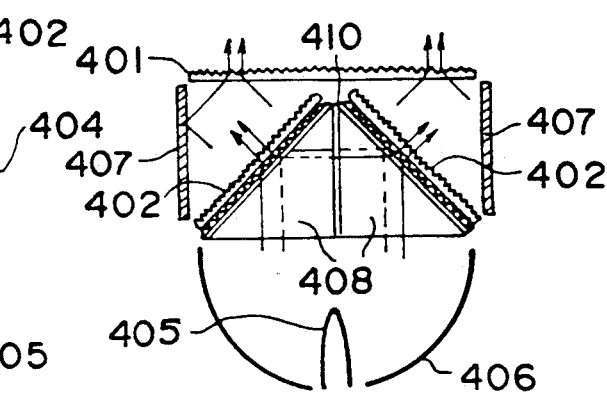
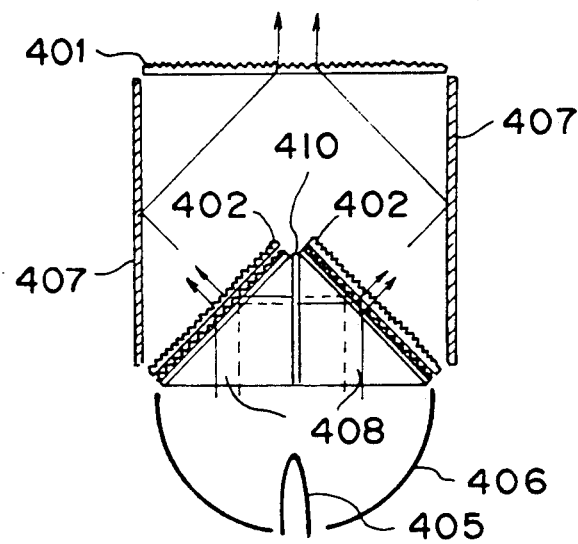
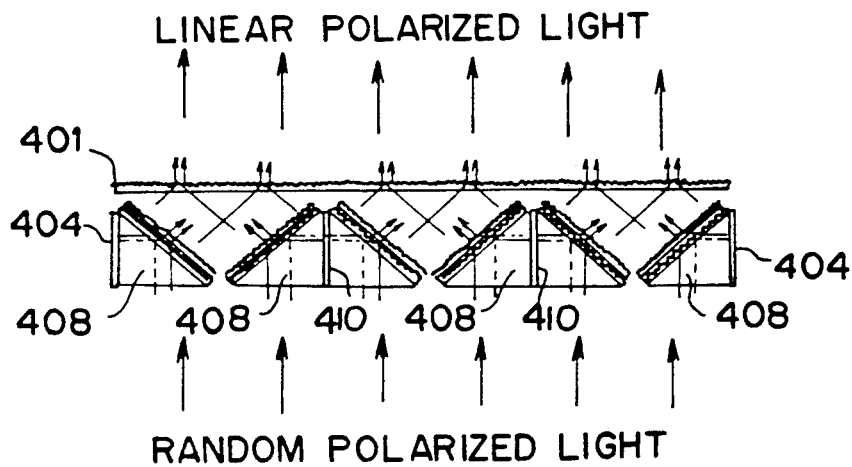

LINEAR POLARIZED LIGHT

RANDOM POLARIZED LIGHT

POLARIZATION FORMING OPTICAL DEVICE AND POLARIZATION BEAM SPLITTER

BACKGROUND OF THE INVENTION

1. Field of the Invention

The present invention relates to a polarization forming optical device for changing a random polarized light from a light source to a linear polarized light and obtaining a linear polarized outgoing light beam, and also relates to a polarization beam splitter which can be utilized as a constitutional element of the polarization forming optical device.

2. Description of the Prior Art

It is known that a linear polarized light beam is useful for a light source of a liquid crystal projector or illumination such that imaging of a light source is undesired (e.g., illumination through a glass surface or a water surface).

Conventionally, such a linear polarized light beam is formed by transmitting light from a light source having a random polarization characteristic (e.g., tungsten lamp, halogen lamp, xenon lamp or metal halide lamp) through a polarizing plate. Upon transmission of the incident light from the light source through the polarizing plate, a polarized light component having a plane of polarization perpendicular to that of a transmitted light is cut off by the polarizing plate. Therefore, a light quantity (transmitted light quantity) to be utilized is reduced to at most 50% of a light quantity from the light source.

Thus, the polarization forming optical device employing the polarizing plate has a problem of large loss of light.

To avoid such a problem, it has been proposed that the light from the light source is first divided into two linear polarized light components by means of a polarization beam splitter and then a plane of polarization of one of the two linear polarized light components is rotated at 90° to follow joining with the other light component.

Such a method is described in Japanese Patent Laid-open Publication No. 63-197913, Japanese Utility Model Laid-open Publication No 63-187101, Japanese Patent Laid-open Publications Nos. 63-271313 and 63-168622, and Japanese Utility Model Laid-open Publication No. 63-150922.

In the method described in Japanese Patent Laid-open Publication No 63-197913 and Japanese Utility Model Laid-open Publication No. 63-187101, one of the two linear polarized light components divided by the polarization beam splitter is successively reflected on two reflecting surfaces to thereby rotate the plane of polarization. Such rotation of the plane of polarization by reflection is preferable from viewpoint of non-dependency upon a wavelength. However, it is not preferable that a size of the device becomes large, so as to ensure an optical path of a reflected light.

In the method described in Japanese Patent Laid-open Publication No. 63-271313 and Japanese Utility Model Laid-open Publication No. 63-150922, a wave plate is used to rotate the plane of polarization. Therefore, the device depends on a wavelength in general, and a size of the device is enlarged more than that of the device described in the above cited references. Accordingly, the application of the device is greatly limited.

In the method described in Japanese Patent Laid-open Publication No. 63-168622, a TN liquid crystal is used to rotate the plane of polarization, so that the above-mentioned function is realized with a relatively compact and simple construction. However, there is a problem of slight attenuation of light upon transmission through a liquid crystal layer. Further, a manufacturing means for the TN liquid crystal is required. Moreover, an s-polarization component reflected on the polarization beam splitter and a p-polarization component transmitted through the polarization beam splitter after rotation of the plane of polarization are diverged to form an outgoing light beam. Therefore, a width of the outgoing light beam becomes twice that of the incident light beam. Further, there is a problem of non-uniformity of brightness of the outgoing light beam due to the slight attenuation of the transmitted light through the liquid crystal layer.

SUMMARY OF THE INVENTION

It is a primary object of the present invention to provide a polarization forming optical device for forming a linear polarized light from a random polarized light source, which satisfies the conditions of (a) compact construction, (b) high efficiency, and (c) easy manufacturing.

It is another object of the present invention to provide a polarization beam splitter which is light in weight and can be effectively utilized in the above-mentioned polarization forming optical device.

It is a further object of the present invention to provide such a polarization forming optical device which can eliminate expansion of a beam width and non-uniformity of brightness of an outgoing light beam.

BRIEF DESCRIPTION OF THE DRAWINGS

FIGS. 13 and 14 are perspective views of FIGS. 1A, 1B and 5, respectively;

FIG. 15 is a view of a prism reflecting surface to be used in the present invention;

FIGS. 58 to 65 and 72 to 80 are plan views of the polarization forming optical device according to the present invention;

DETAILED DESCRIPTION OF THE INVENTION

The polarization forming optical device of the present invention is so designed as to divide an incident light from a light source into two linear polarized light components by means of a polarization beam splitter (polarizing film) and rotate a plane of polarization of one of the two linear polarized light components 90° to follow joining with the other light component. As means for rotating the plane of polarization, a reflector or a transmitter having a function of rotating the plane of polarization at 90° is employed.

First, the reflector having the function of rotating the plane of polarization at 90° will be described below.

Examples of such a reflector include a prism reflecting surface, a combination of ¼ wave plate and a plane mirror, or a phase plate located before the prism reflecting surface.

Figure 16:
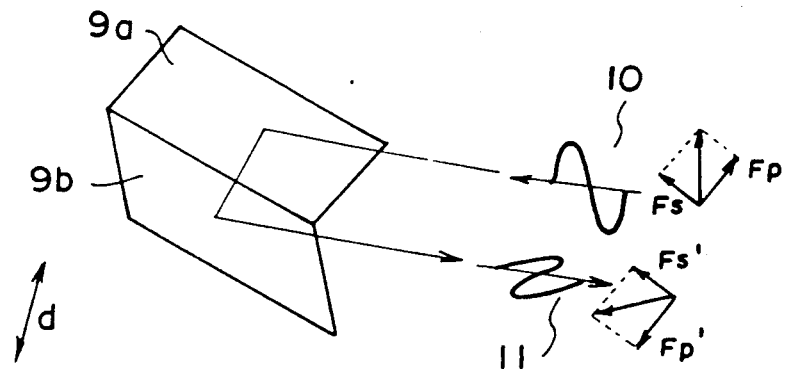
FIG. 16 is an illustration of a polarization principle in which a plane of polarization of a reflected light on the prism reflecting surface is rotated at 90°.

FIG. 16 shows a polarization principle such that a plane of polarization is rotated at 90° by reflection on the prism reflecting surface. Referring to FIG. 16, a linear polarized light 10 incident on a surface 9a is divided into a component Fs parallel to a ridgeline of a prism and a component Fp perpendicular to the ridgeline, which components are vectors of an electric field. If the surfaces 9a and 9b are reflecting surfaces of a perfect conductor, a direction of the component Fp reflected on the surfaces 9a and 9b is inverted to provide a component Ep' of a reflected light 11. As a result, a plane of polarization of the incident light 10 is rotated at 90° to provide the reflected light 11.

However, the reflecting surface of the perfect conductor does not actually exist. Accordingly, a phase difference Δ between the component Fs' and the component Fp' is normally generated. Further, both the components have different amplitudes. Therefore, the reflected light 11 becomes an elliptic polarized light. Accordingly, only a component of the elliptic polarized light having a plane of polarization perpendicular to that of the incident light is effective. The smaller the phase difference Δ, the more the reflecting surface becomes near the perfect conductor to increase the efficiency.

FIG. 15 shows an example of the prism reflecting surface. Referring to FIG. 15, the reflecting surface is formed of a substrate 14 having one surface formed with a plurality of reflecting mirror surfaces arranged in parallel rows in a direction d perpendicular to a ridgeline formed between the adjacent ones of the reflecting mirror surfaces. The adjacent reflecting mirror surfaces intersect each other at 90°, and each reflecting mirror surfaces is inclined at 45° with respect to a normal direction U of the substrate surface. The perpendicular intersection of the adjacent reflecting mirror surfaces is the condition required for the fact that an incident light entering in the normal direction U is reflected in a direction counter to the normal direction U. Further, it is most preferable from the viewpoint of efficiency that each reflecting mirror surface is inclined at 45° with respect to the normal direction U. The reflecting mirror surfaces can be formed by forming one surface of the substrate 14 into a predetermined shape and then forming a metal layer by vapor deposition or plating or a dielectric multi-layer film on the one surface of the substrate 14. In the case of using a transparent material for the substrate 14, the plane surface can be used as an incident surface, and the prism surface can be used as a back surface mirror. Further, in the case that a reflective index of the substrate 14 is greater than $(2)^{1/8}$, the prism surface can be used as a total reflection surface. In the reflecting mirror surface having the metal layer or the dielectric multi-layer film, the phase difference Δ depends on a kind of metal, a film thickness or design of the multi-layer film. However, in the case that the prism surface is used as the total reflecting mirror, the phase difference Δ can be calculated from the refractive index. For example, when the refractive index is 1.49 (polymethylmethacrylate), the phase difference Δ is 70°. Accordingly, a component after rotation of a plane of polarization at 90° is obtained at a rate of 67%. As a reflectance of the component on the total reflecting mirror is substantially 100%, the efficiency on the reflecting surface is substantially 67%.

Figure 17:
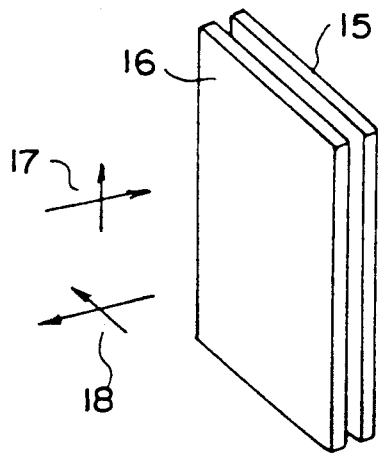
FIG. 17 is a perspective view of a combination of a ¼ wave plate and a plane mirror, which constitutes the reflecting surface to be used in the present invention.

Next, the reflector employing the ¼ wave plate having the function of rotating the plane of polarization at 90° will be described below. FIG. 17 shows an example of the reflecting surface constructed of a reflecting mirror 15 and a ¼ wave plate 16 located before the reflecting mirror 15. An incident light 17 is transmitted through the ¼ wave plate 16 before reflection on the reflecting mirror 15, and a reflected light 18 from the reflecting mirror 15 is transmitted again through the ¼ wave plate 16. Thus, the plane of polarization of the incident light 17 is rotated at 90° to obtain the reflected light 18.

The reflecting mirror 15 may be formed from a metal mirror or a dielectric multi-layer film. Alternatively, the reflecting surface may be a reflecting surface of a metal mirror or a dielectric multi-layer film on one surface of the ¼ wave plate 16.

In this case, since the wave plate is used, the efficiency of obtaining the reflected light after rotation of the plane of polarization at 90° depends on a wavelength. Accordingly, in the case of using a white light, this construction is not preferable. To reduce such a wavelength dependency, an achromatic wave plate formed of combined double refraction materials having different wavelength dispersion properties may be used.

Figure 18:
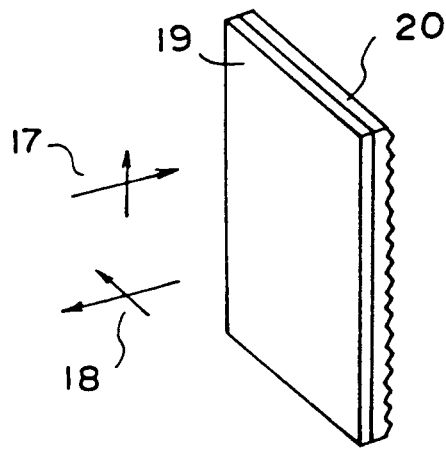
FIG. 18 is a perspective view of a phase plate located before the prism reflecting surface.

FIG. 18 shows an example of the reflecting surface employing a phase plate 19 located before a prism reflecting surface 20. As mentioned above, the phase difference Δ between the component Fs' and the component Fp' of the reflected light from the prism reflecting surface is not zero, and the reflected light is therefore an elliptic polarized light. The phase difference Δ can be canceled by locating the phase plate 19 for generating a total phase difference −Δ which is the same as the phase difference Δ in magnitude but inverted in sign. Thus, a linear polarized light with the phase difference Δ eliminated can be obtained. As the transmission of light through the phase plate 19 is carried out before and after reflection on the prism reflecting surface 20, a retardation of the phase plate 19 is set to −Δ/2.

In this case, as the phase difference to be provided by the phase plate is relatively small, the wavelength dependency is small as a whole, and a white light can be sufficiently used. While the prism reflecting surface may be selected from the above-mentioned materials, it is most preferable to use a total reflecting prism which has a high reflectance and is advantageous in easy calculation of the phase difference Δ. For example, in the case of using a polymethylmethacrylate prism, the phase difference Δ is 70°, and accordingly the phase plate providing a retardation of 35° is used to thereby easily obtain a high efficiency over the entire wavelength region of a visible light.

As such a prism reflecting surface can be made sufficiently thin, the device can be made compact and lightweight.

The polarization beam splitter according to the present invention is realized by substituting a transparent plate formed with a plurality of prism elements for at least one of two rectangular prisms of a conventional prism type beam splitter. Accordingly, the polarization beam splitter can be made lightweight.

The polarization beam splitter according to the present invention can be used for the applications as described in the aforementioned cited references, that is, Japanese Patent Laid-open Publication No. 63-197913, Japanese Utility Model Laid-open Publication No. 63-187101, Japanese Patent Laid-open Publication Nos. 63-271313 and 63-168622.

Next, there will be described the transmitter having the function of rotating the plane of polarization at 90°. Such a transmitter is constructed of a ½ wave plate, for example, wherein an incident light is transmitted through the ½ wave plate in such a manner that an angle defined between a plane of polarization of the incident light and and optic axis of the ½ wave plate is 45°.

With this construction, the plane of polarization of the incident light is rotated irrespective of a direction of the incident light. Accordingly, the ½ wave plate can be used in case of bidirectional light transmission.

The ¼ wave plate, the ½ wave plate and the phase plate are obtained by forming a crystal of an inorganic substance such as mica or rock crystal to a predetermined thickness or drawing a high-molecular film indicating a double refraction such as polycarbonate or polyester to a predetermined magnitude.

After the rotation of the plane of polarization at 90°, the reflected or transmitted light component and/or the other light component divided by the polarizing film are reflected on reflecting means to change an advancing direction, and both the light components are then synthesized at an intersecting position thereof to obtain a single light beam.

Accordingly, expansion of a beam width due to the formation of the polarized light can be reduced. Further, the generation of non-uniformity of brightness in an outgoing light beam can be avoided by using a prism row of plural microprisms as a light beam synthesizing means.

Expansion of the light beam width can be eliminated by arranging a light beam width reducing portion before or behind the above polarization forming means, the light beam width reducing portion comprising reflecting means and a prism formed plate having a plurality of microprisms arranged in rows.

DETAILED DESCRIPTION OF THE PREFERRED EMBODIMENTS

There will now be described some preferred embodiments of the present invention with reference to the drawings.

A preferred embodiment is realized by substituting the combination of a ¼ wave plate and a plane mirror for a prism reflecting surface to be used in other preferred embodiments, and a preferred embodiment is realized by additionally locating a phase plate before the prism reflecting surface to be used in those other preferred embodiments.

Figure 1A:
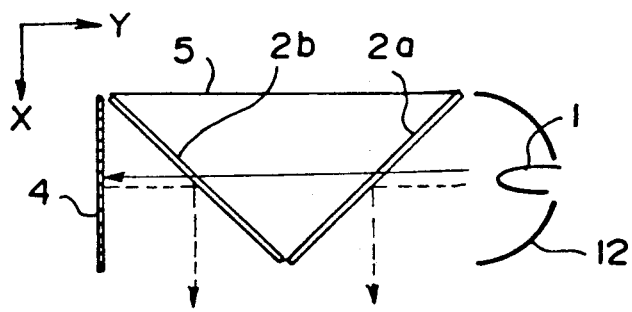
FIGS. 1A to 4B, 5 to 8, 11, 12, 19A and 19B are plan views of the polarization forming optical device according to the present invention.
Figure 1B:
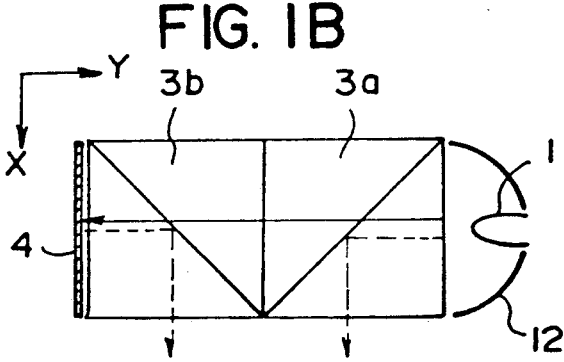

FIG. 13 is a perspective view of a preferred embodiment, and FIG. 1A is a plan view as seen in a direction of Z-axis in FIG. 13. An s-polarization component (a component having a plane of polarization parallel to a sheet of the drawing, as shown by a dashed line in FIG. 1A) of light from a light source 1 is changed in advancing direction to a positive direction of X-axis by a polarization beam splitter 2a, and outgoes therefrom. On the other hand, a p-polarization component (a component having a plane of polarization perpendicular to the sheet of the drawing, as shown by a solid line in FIG. 1A) is transmitted through the polarization beam splitters 2a and 2b to reach a prism reflecting surface 4. Upon reflecting on the prism reflecting surface 4, the plane of polarization of the p-polarization component is rotated at 90° to obtain an s-polarization component which in turn reaches the splitter 2b. Then, the s-polarization component is reflected on the splitter 2b to outgo in the positive direction of X-axis which is the same direction as the outgoing direction of the s-polarization component previously reflected on the splitter 2a. In this manner, an s-polarized light beam oriented in a direction perpendicular to an incident beam is obtained, in which there is no loss in principle to obtain a high efficiency. Reference numeral 12 designates a curved mirror for making the rays of light from the light source 1 substantially parallel.

Further preferred embodiments will now be described with reference to plan views.

Figure 2A:
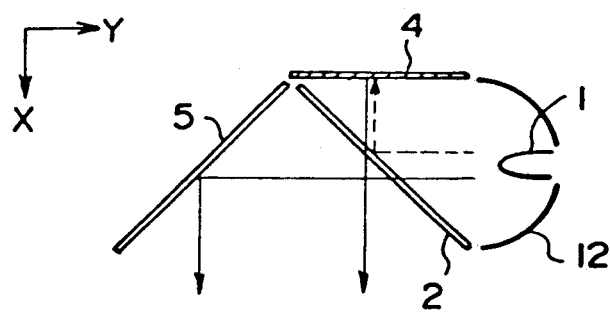
Figure 2B:
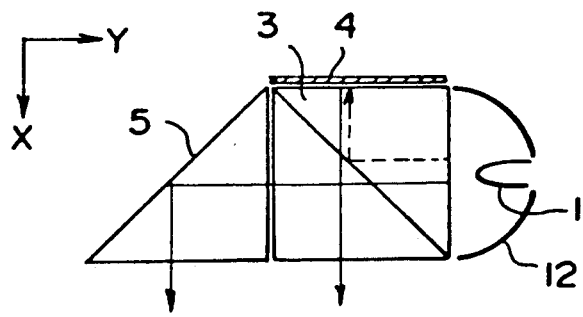

FIG. 2A is a plan view showing a preferred embodiment. An s-polarization component of light from a light source 1 is reflected on a polarization beam splitter 2 to reach a prism reflecting surface 4. Upon reflecting on the prism reflecting surface 4, the plane of polarization of the s-polarization component is rotated at 90° to obtain a p-polarization component which is in turn transmitted through the polarization beam splitter 2 to outgo in the positive direction of X-axis. On the other hand, a p-polarization component of the light from the light source 1 is transmitted through the splitter 2, and is then reflected on a reflecting mirror 5 to outgo in the positive direction of X-axis. Thus, a p-polarized light beam oriented in a direction perpendicular to an incident beam is obtained.

Figure 3A:
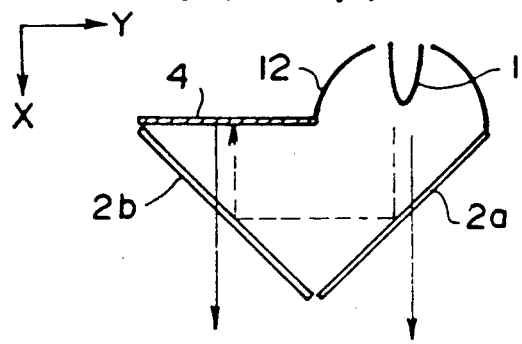
Figure 3B:
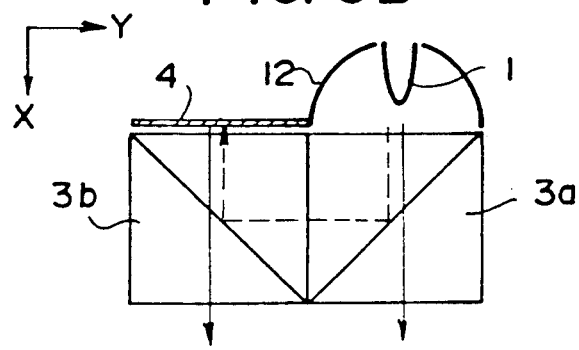

FIG. 3A is a plan view showing a preferred embodiment. An s-polarization component of light from a light source 1 is reflected on polarization beam splitters 2a and 2b to reach a prism reflecting surface 4. Upon reflecting on the prism reflecting surface 4, the plane of polarization of the s-polarization component is rotated at 90° to obtain a p-polarization component which is in turn transmitted through the polarization beam splitter 2b to outgo in the positive direction of X-axis. On the other hand, a p-polarization component of the light from the light source 1 is transmitted through the splitter 2a to outgo in the positive direction of X-axis. Thus, a p-polarized light beam oriented in a direction parallel to an incident beam is obtained.

Figure 4A:
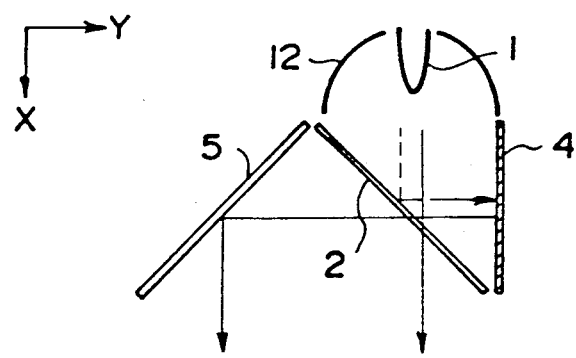
Figure 4B:
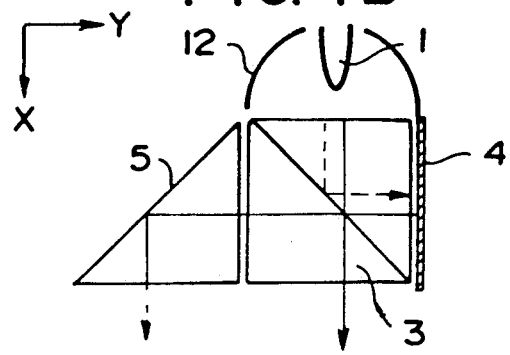

FIG. 4A is a plan view showing a preferred embodiment. An s-polarization component of light from a light source 1 is reflected on a polarization beam splitter 2 to reach a prism reflecting surface 4. Upon reflecting on the prism reflecting surface 4, the plane of polarization is rotated at 90° to obtain a p-polarization component which is in turn transmitted through the polarization beam splitter 2 to reach a reflecting mirror 5. After reflection on the reflecting mirror 5, the p-polarization component outgoes in the positive direction of X-axis. On the other hand, a p-polarization component of the light from the light source 1 is transmitted through the splitter 2 to outgo in the positive direction of X-axis. Thus, a p-polarized light beam oriented in a direction parellel to an incident beam.

Figure 5:
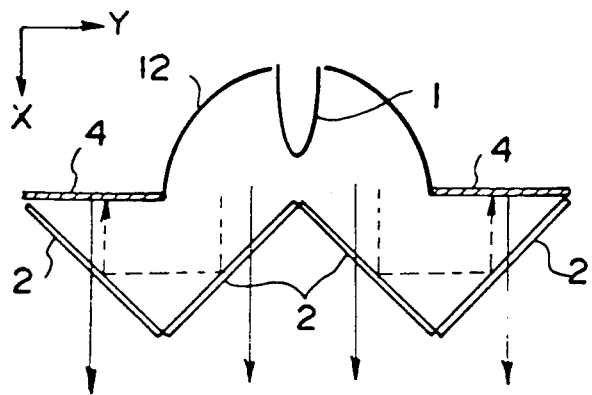
Figure 6:
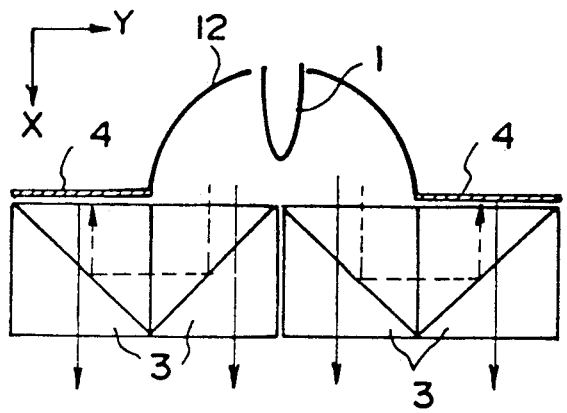

FIG. 5 is a plan view showing a preferred embodiment. This preferred embodiment is constructed by combining two of the device of the preferred embodiment of FIG. 3A in symmetrical relationship with respect to an X-Z plane, and using a common light source. With this construction, a portion of the device except the light source can be reduced in volumetric size to ½ or less as compared with the preferred embodiment of FIG. 3A, thus making the device greatly compact. FIG. 14 is a perspective view of the preferred embodiment of FIG. 5.

Figure 7:
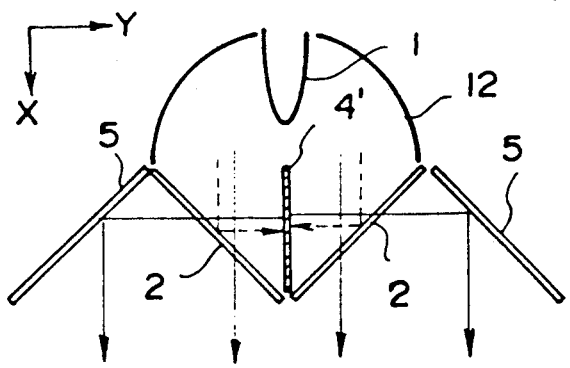
Figure 8:
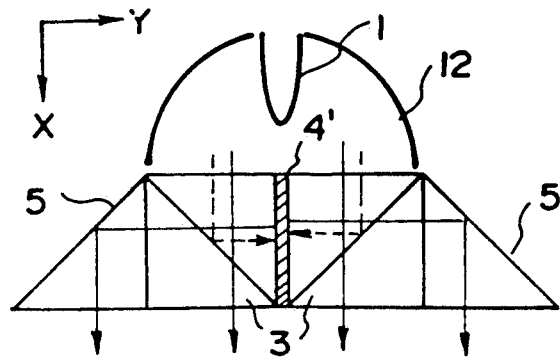

FIG. 7 is a plan view showing a preferred embodiment. This preferred embodiment is constructed by combining two of the device of the preferred embodiment of claim 5 in symmetrical relationship with respect to an X-Z plane, and using a common light source. With this construction, the device can be greatly compact as similar to the preferred embodiment shown in FIG. 5. Reference numeral 4' designates two prism reflecting surface laminated together.

The polarization beam splitter employable in the preferrred embodiment is generally classified into a mirror type (plate type) and a prism type (cube type).

The mirror type polarization beam splitter is formed by coating multiple layers of optical thin films on a transparent plate. The splitter of this type separates an s-polarization component from a p-polarization component by utilizing the fact that these components have different reflectances. Although this type splitter is superior from the viewpoint of lightness in weight, it is limitedly used for a monochromatic light because of a narrow wavelength band. A normal dielectric multi-layer film beam splitter also has a polarization characteristic to some extent (e.g. s-polarization component:p-polarization component=about 2:8). Accordingly, this splitter may be used as a polarization beam splitter for light having a wide wavelength band. However, this splitter is remarkably inferior in efficiency to the prism type polarization beam splitter to be described below.

The prism type polarization beam splitter is formed by attaching two rectangular prisms together with a multi-layer polarizing film interposed therebetween. The splitter of this type can be used for a substantially entire wavelength band of a visible light, that is, a white light. However, this type is inferior in lightness to the mirror type. The multi-layer polarizing film as mentioned above is a dielectric multi-layer film formed by alternately laminating a substance having a high refractive index and a substance having a low refractive index so as to obtain an angle of refraction equal to a Brewster's angle.

The preferred embodiments shown in FIGS. 1A, 2A, 3A, 4A, 5 and 7 employ the mirror type polarzation beam splitter, while the preferred embodiments shown in FIGS. 1B, 2B, 3B, 4B, 6 and 8 employ the prism type polarization beam splitter.

As mentioned above, the prism type polarization beam splitter is advantageous in performance but inferior in lightness. To cope with this, both the performance and the lightness can be satisfied by the polarization beam splitters of FIGS. 9A-B and 10A-B.

Figure 9A:
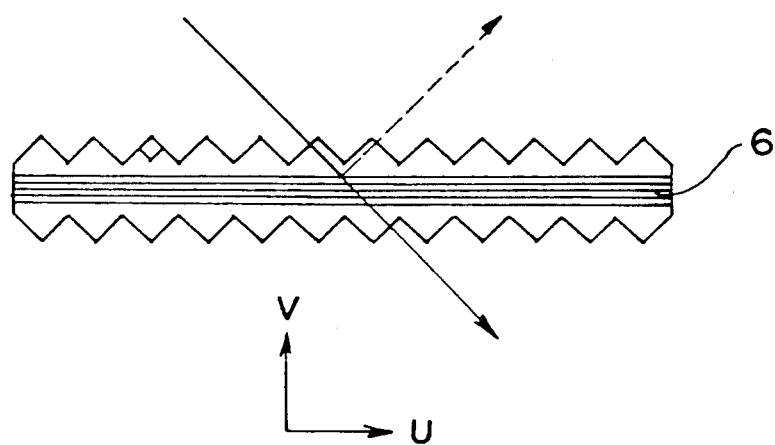
FIGS. 9A to 10B are views of the polarization beam splitters of different types according to the present invention.
Figure 9B:
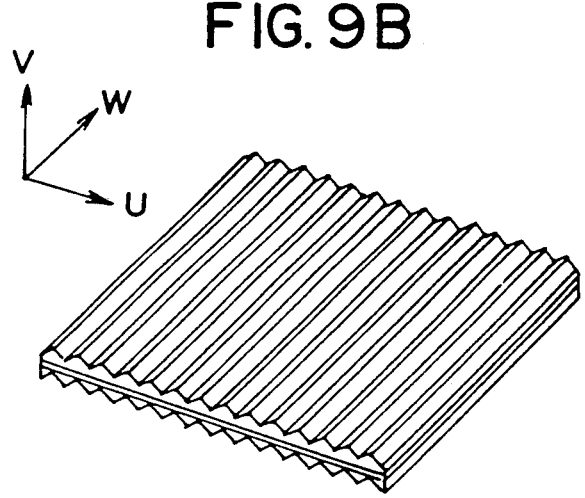

FIGS. 9A and 9B show a preferred embodiment. The polarization beam splitter shown in FIGS. 9A and 9B is formed by interposing a multi-layer polarizing film 6 between two transparent plates each formed with rows of rectangular prism elements. The multi-layer polarizing film 6 is the same as that of the prism type polarization beam splitter. The surfaces of each prism element formed on each transparent plate has the same function as that of the incident surface, the reflecting surface and the outgoing surface of the prism type polarization beam splitter. Consequently, the polarization beam splitter shown in FIGS. 9A and 9B has the same function as that of the prism type polarization beam splitter. It is not preferable to apply the splitter as shown in FIGS. 9A and 9B to a coherent light such as a laser beam because coherence is disturbed. However, in the case where the splitter is applied to an incoherent light source as in the present invention, there is no problem but the same function as that of the prism type polarization beam splitter can be obtained. Further, as apparent from FIGS. 9A and 9B, the splitter shown equally matches the mirror type splitter in lightness.

Figure 10A:
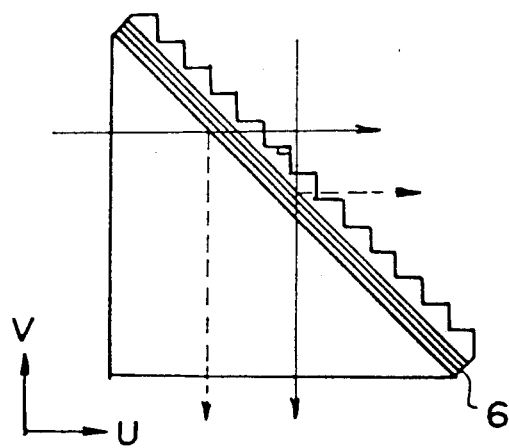
Figure 10B:
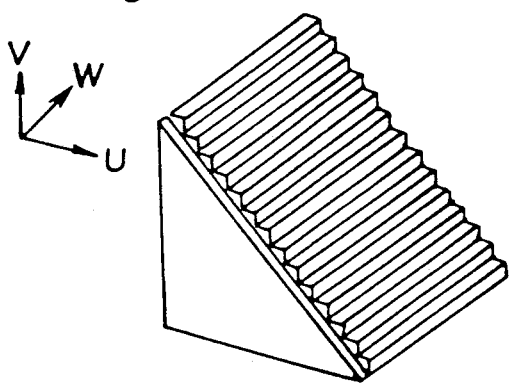

FIGS. 10A and 10B show a preferred embodiment. The polarization beam splitter shown in FIGS. 10A and 10B is constructed by substituting one of the transparent plates formed with the rows of the prism elements shown in FIGS. 9A and 9B for one of the rectangular prisms of the prism type polarization beam splitter. As easily appreciated, the function of the splitter of FIGS. 10A and 10B is the same as that of the prism type splitter and the splitter of FIGS. 9A and 9B. However, the weight of the splitter of FIGS. 10A and 10B is about half that of the prism type splitter.

Although it is not advantageous in lightness to employ the prism type polatiztion beam splitter in the polarization forming optical device of the present invention, the employment of the prism type splitter is advantageous from the viewpoints that the prisms function as a light conductor and that the manufacturing is easy. For example, it is unnecessary to adjust an angle of the splitter by setting the splitter on the basis of the prism surfaces. In this circumstance, the polarization beam splitter of maintains one of the rectangular prisms.

A manufacturing method of the polarization beam splitters of FIGS. 9A-B and 10A-B is basically the same as that of the prism type splitter. That is, the multi-layer polarizing film is formed on one of the transparent plates having the prism elements or on the prism by vapor deposition or the like, and then the other transparent plate having the prism elements is bonded to the multi-layer polarizing film.

Figure 11:
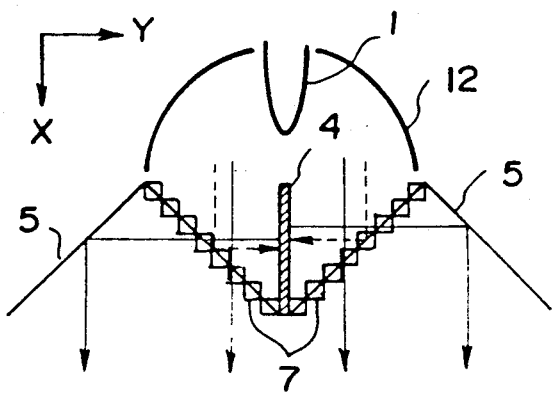
Figure 12:
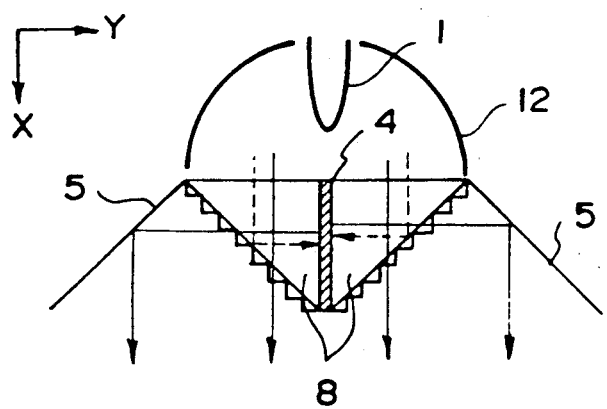

FIG. 11 shows a preferred embodiment obtained by applying the polarization beam splitter of FIGS. 9A and 9B to the polarization forming optical device FIG. 7, and FIG. 12 shows a preferred embodiment obtained by applying the polarization beam splitter of FIGS. 10A and 10B to the polarization forming optical device of FIG. 7.

Figure 19A:
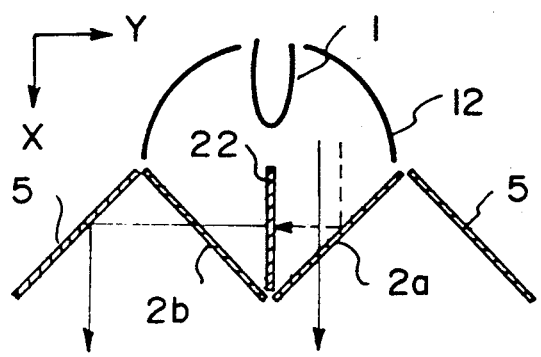

FIG. 19A shows a preferred embodiment. This preferred embodiment is obtained by substituting a single ½ wave plate 22 for the two prism reflecting surfaces 4' in the preferred embodiment shown in FIG. 7. Referring to FIG. 19A, an s-polarization component of light from a light source 1 incident on a right unit is reflected on a polarization beam splitter 2a, and is then transmitted through a ½ wave plate 22, thereby rotating the plane of polarization of the s-polarization component at 90° to obtain a p-polarized light. The p-polarized light enters a left unit arranged in symmetrical relationship with the right unit, and is transmitted through a polarization beam splitter 2b to reach a reflecting mirror 5. After reflecting on the reflecting mirror 5, the p-polarized light outgoes in a positive direction of X-axis. On the other hand, a p-polarization component of the light from the light source 1 incident on the right unit is transmitted through the polarization beam splitter 2a to outgo in the positive direction of X-axis. As to an s-polarization component and a p-polarization component incident on the left unit from the light source 1, a p-polarized light beam oriented in the positive direction of X-axis can be similarly obtained.

The ½ wave plate is disposed in such a manner that an optic axis thereof is inclined at 45° with respect to the plane of polarization, so that the rotation of the plane of polarization can be effected without dependency upon a direction of transmission of the light.

Figure 19B:
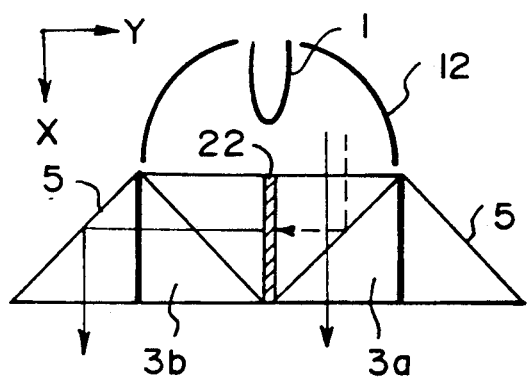

FIG. 19B also shows a preferred embodient. This preferred embodiments is obtain byh substituting a single ½ wave plate 22 for the two prism reflecting surface 4' in the preferred embodiment shown in FIG. 8.

A preferred embodiment is realized by substituting the combination of a ½ wave plate and a plane mirror for a prism reflecting surface to be used in the preferred embodiments of FIGS. 27, 28, and 29A-B to be described below, and another preferred embodiment is realized by additionally locating a phase plate before the prism reflecting surface to be used in the preferred embodiments of FIGS. 27, 28 and 29A-B.

FIGS. 27, 28, 29A and 29B are plan views of preferred embodiments.

Figure 27:
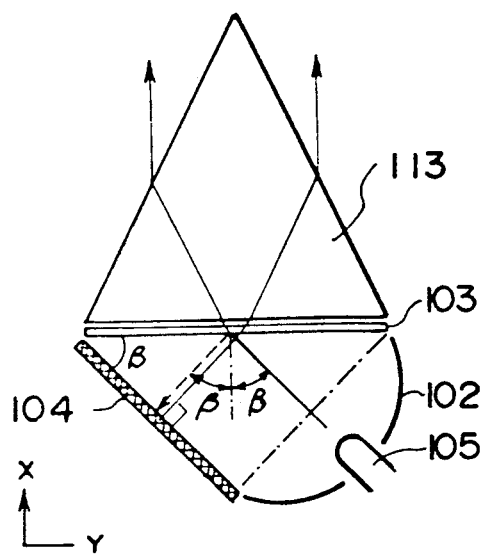

In the preferred embodiment shown in FIG. 27, rays of light from a light source 105 are made parallel by a curved mirror 102, and are incident on a mirror type polarization beam splitter 103 at an angle β. An p-polarization component (shown by a solid line in the drawing) of the incident light on the splitter 103 is transmitted through the polarization beam splitter 103, and is then refracted by a prism 113 to outgo therefrom. On the other hand, an s-polarization component (shown by a dashed line in the drawing) of the incident light on the splitter 103 is reflected on the splitter 103 to reach a prism reflecting surface 104. Upon reflecting on the prism reflecting surface 104, a plane of polarization of the s-polarization component is rotated at 90° to obtain a p-polarized light which is in turn transmitted through the splitter 103. Then, the p-polarized light is refracted by the prism 113 to outgo therefrom. Thus, the above two outgoing light beams are parallel and adjacent to each other, and they can be therefore utilized as a single linear polarized light beam.

Figure 28:
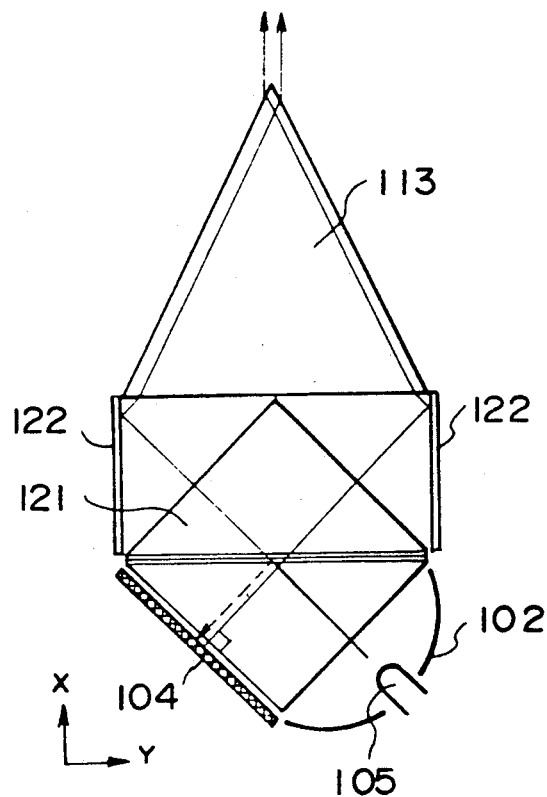

In the preferred embodiment shown in FIG. 28, a prism type polarization beam splitter 121 is substituted for the mirror type polarization beam splitter 103 used in FIG. 27. Further, as the prism type splitter is used, a pair of reflecting mirrors 122 are located between the splitter 121 and the prism 113 to obtain the same effect as that of the preferred embodiment shown in FIG. 27.

Figure 29A:
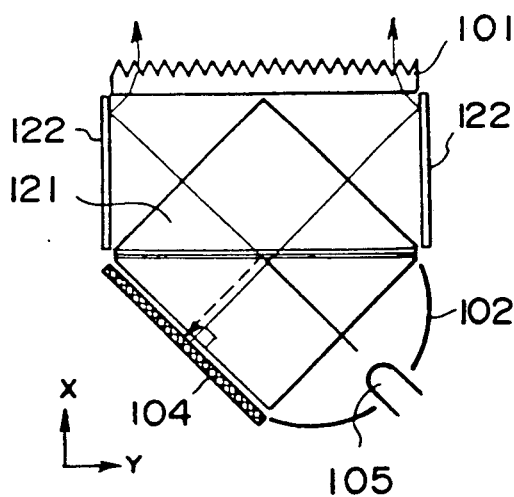

In the preferred embodiment shown in FIG. 29A, a prism formed plate 101 is substituted for the prism 113 used in FIG. 28. The prism formed plate 101 is constructed in such a manner that a lower surface of the plate 101 facing the prism type polarization beam splitter 121 is a plane surface, and an upper surface of the plate 101 is formed with a plurality of small prism elements similar to the prism 113 shown in FIG. 28, which prism elements are arranged in parallel rows. With this construction, the device can be made compact.

In this device, a p-polarization component of light from a light source 105 is transmitted through the prism type polarization beam splitter 121, and is then reflected on a left reflecting mirror 122 to outgo from a left half portion of the prism formed plate 101. On the other hand, an s-polarization component of the light from the light source 105 enters the prism type polarization beam splitter 121, and is reflected on a polarizing film sandwiched between two rectangular prism elements of the splitter 121 to reach a prism reflecting surface 104. Upon reflecting on the prism reflecting surface 104, the plane of polarization of the s-polarization component is rotated at 90° to obtain a p-polarized light which is in turn transmitted through the splitter 121, and is then reflected on a right reflecting mirror 122 to outgo from a right half portion of the prism formed plate 101. In this construction, however, there is a possibility of generation of a difference in intensity or color between the two outgoing light beams from the right and left half portions of the prism formed plate 101.

Figure 29B:
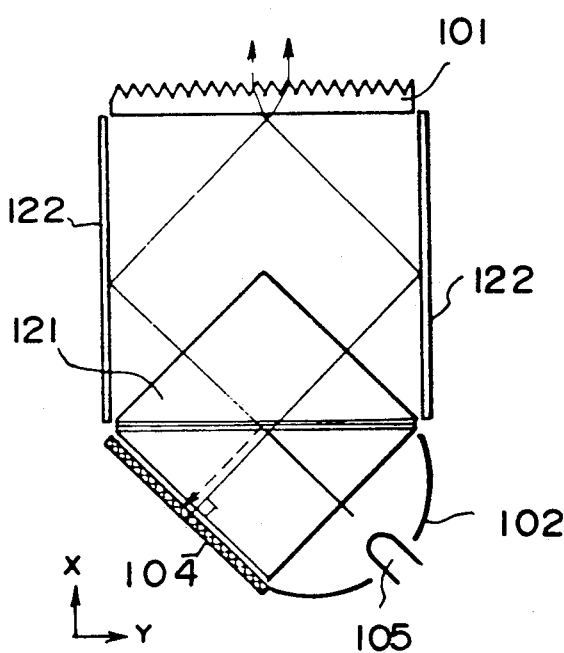

Such a problem can be prevented by the construction of the preferred embodiment shown in FIG. 29B, in which the reflecting mirrors 122 are made longer than those shown in FIG. 29A to increase a distance between the prism type polarization beam splitter 121 and the prism formed plate 101, so that the two outgoing light beams can outgo from the entire surface of the prism formed plate 101.

The polarization forming optical device to be described below is particularly compact and simple in structure, which is further improved in practical use.

Figure 20:
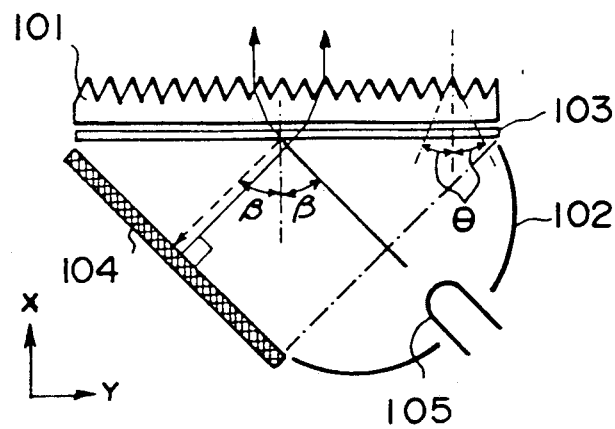
FIGS. 20 to 22, 24, 25, and 27, 28, 29A, 29B and 30 to 32 are plan views of the polarization forming optical device according to the present invention.
Figure 24:
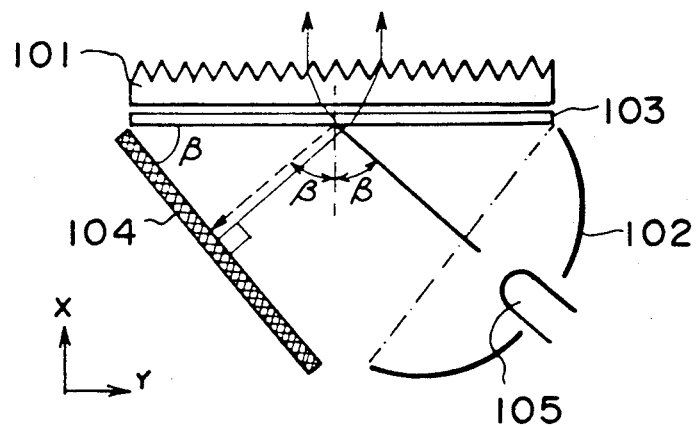
Figure 25:
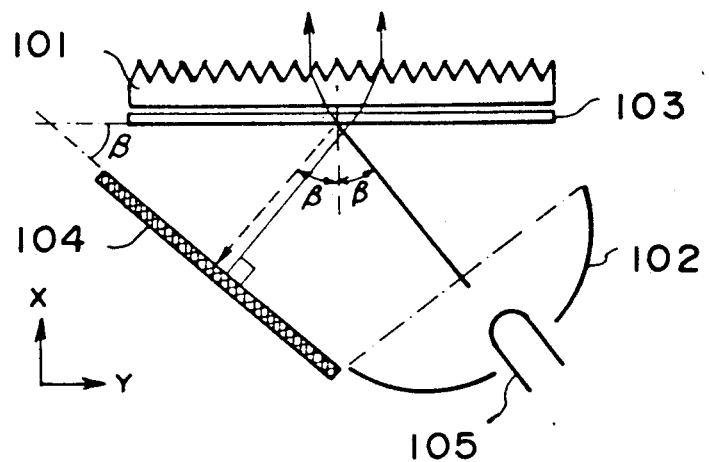

FIGS. 20, 24 and 25 show further preferred embodiments, wherein incident angles $\beta$ onto mirror type polarization beam splitters 103 in these preferred embodiments are set to $\beta = 45°$, $\beta > 45°$ and $\beta < 45°$.

Figure 23:
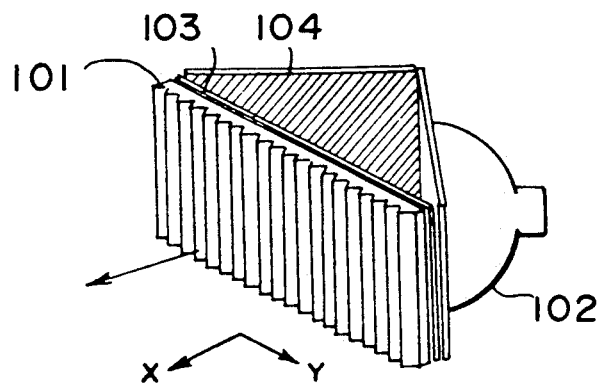
FIG. 23 is a perspective view of FIG. 20.

The preferred embodiment shown in FIG. 20 is realized by substituting a prism formed plate 101 similar to that shown in FIGS. 29A and 29B for the prism 113 shown in FIG. 27. With this construction, the device can be greatly compact. FIG. 23 is a perspective view of FIG. 20. That is, as a mirror type polarization beam splitter 103 is used in FIG. 20, the device can be reduced in size to ½ or less as compared with the device shown in FIGS. 29A and 29B. Further, the employment of the mirror type polarization beam splitter enables the incident angle $\beta$ to be set to various angles such as $\beta = 45°$ (FIG. 20), $\beta > 45°$ (FIG. 24) and $\beta < 45°$ (FIG. 25). Above all, the preferred embodiment shown in FIG. 20 is most preferable since it can be manufactured compactly and easily.

Figure 70:
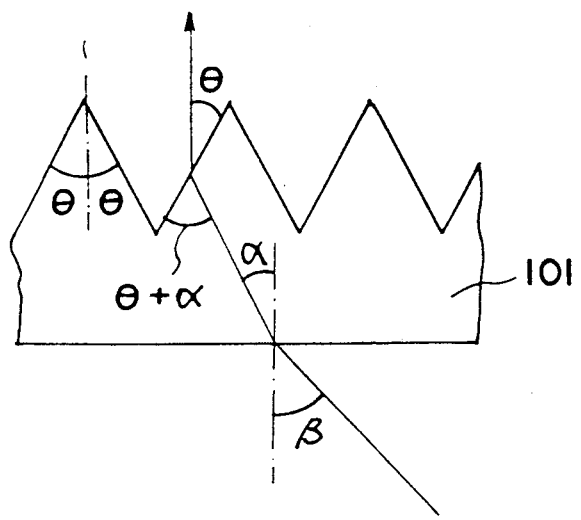
FIG. 70 is an illustration of transmission of light through the prism formed plate.

As shown in FIG. 23, the prism elements of the prism formed plate 101 are arranged in parallel rows in a direction of Y-axis. As apparent from FIG. 70, in order to make the light outgo in a normal direction of the prism formed plate 101, it is necessary to select an angle $\theta$ defined between one of two adjacent surfaces of each prism element and the normal of the prism formed plate so as to satisfy the following equations (1).

$$n \sin \alpha = \sin \beta$$
$$n \cos (\alpha + \theta) = \cos \theta \quad (1)$$

where n represents a refractive index of the prism formed plate 101, and $\beta$ represents an incident angle to the prism formed plate 101. Since the incident angle $\beta$ is 45° the following equations (2) and (3) are obtained from the above equations (1).

$$\sin \alpha = 1/(n \cdot 2^{\frac{1}{2}}) \quad (2)$$
$$\tan \theta = (2n^2 - 1)^{\frac{1}{2}} - 2^{\frac{1}{2}} \quad (3)$$

Since $\theta > 0$, it is understood that $n > (3/2)^{\frac{1}{2}}$ should hold from the equation (3).

Figure 26A:
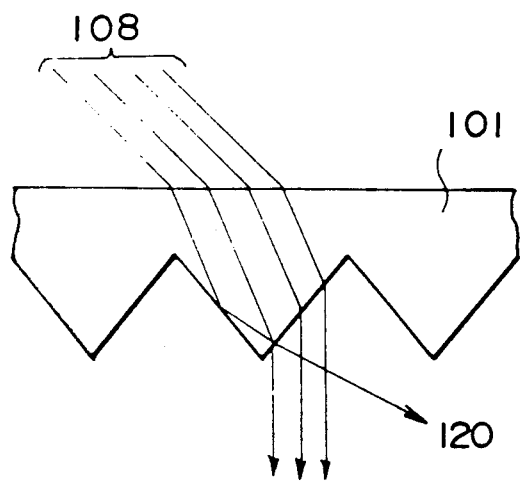
FIGS. 26A and 26B are an illustration of transmission of light through a prism formed plate to be used in the present invention.
Figure 26B:
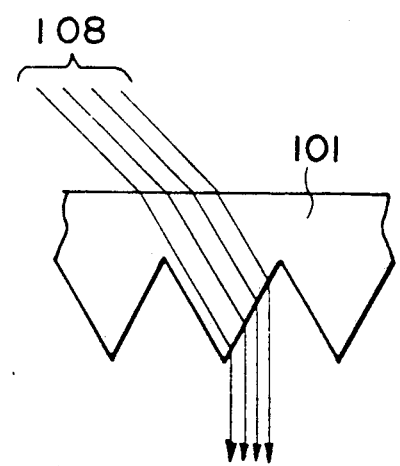

It is preferable that the angle $\theta$ is to be selected so as to hold $\alpha \geq \theta$. If $\alpha < \theta$ as shown in FIG. 26A, a part of an incident light 108 is reflected on the opposite surface of each prism element to generate a loss light 120 having a different advancing direction. Thus, parallel outgoing light beams cannot be obtained to cause a reduction in efficiency. Accordingly, in order to make the outgoing light beams parallel as shown in FIG. 26B, the refractive index n of the prism formed plate should be selected as follows:

$$\tan \alpha = \{\sin^2 \alpha/(1 - \sin^2 \alpha)\}^{\frac{1}{2}}$$

Substituting the equation (2) for the above equation, the following is given.

$$\tan \alpha = 1/(2n^2 - 1)^{\frac{1}{2}}$$

Since $\alpha \geq \theta$ should hold, and accordingly $\tan \alpha \geq \tan \theta$ should hold, the following condition is obtained from the equation (3).

$$n \leq \{(3 + 3^{\frac{1}{2}})/2\}^{\frac{1}{2}} = 1.538 \quad (4)$$

Thus, the refractive index of the prism formed plate is preferably selected to satisfy the above condition (4). However, even if the value of n is greater than the value obtained from the condition (4) to result in the generation of the loss light as shown in FIG. 26A, the efficiency is not rapidly reduced, provided that $\alpha \approx \theta$ holds.

Further, the smaller the angle $\theta$, the larger the angle of refraction to expand a broadening angle of the light beam. From this point of view, the refractive index n is preferably selected to satisfy the equality of the expression (4).

Figure 21:
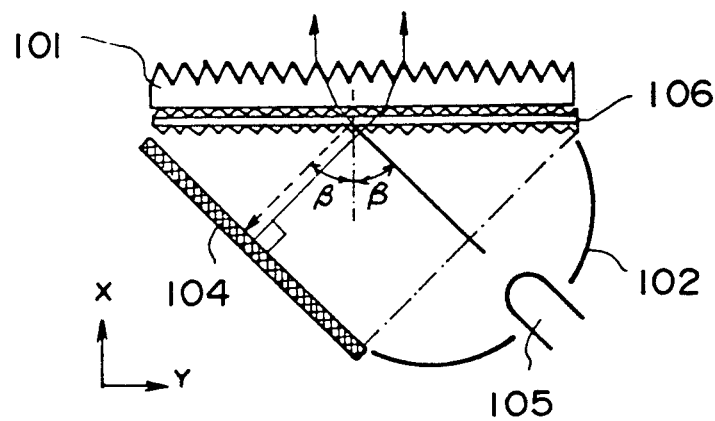
Figure 22:
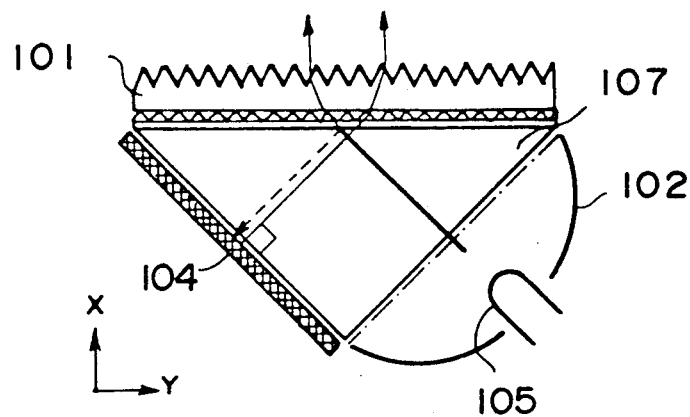

The preferred embodiments shown in FIGS. 21 and 22 are realized by applying the polarization beam splitters of FIGS. 9A-B and 10A-B, respectively, to a device similar to the preferred embodiment shown in FIG. 20.

In the preferred embodiment shown in FIG. 21, a polarization beam splitter 106 similar to that shown in FIG. 9 is employed.

In the preferred embodiment shown in FIG. 22, a polarization beam splitter 107 similar to that shown in FIG. 10 is employed.

In the above preferred embodiments, a width of the linear polarized light beam to be finally obtained is larger than that of the random polarized beam to be first obtained by the light source 105 and the curved mirror 102. Particularly in the preferred embodiments shown in FIGS. 20 to 25 and 27 to 29, the width is expanded by the (1/cos $\beta$) times in the direction of Y-axis. Accordingly, a cross section of the polarized light beam to be finally obtained tends to be elongated in the direction of Y-axis. This is not necessarily desired from the viewpoint of utilization of the polarized light beam to be finally obtained.

Figure 30:
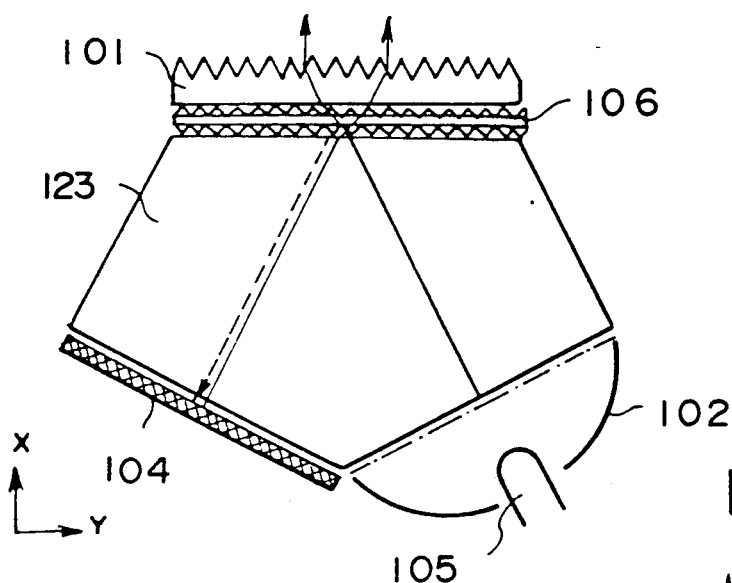
Figure 31:
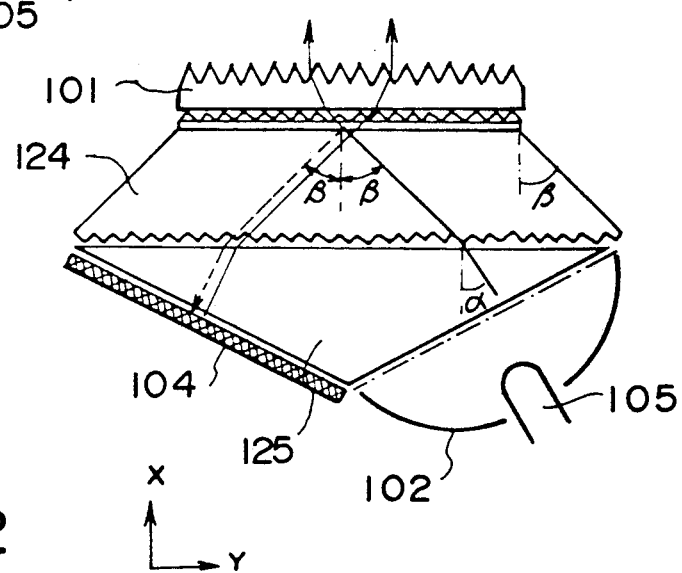
Figure 32:
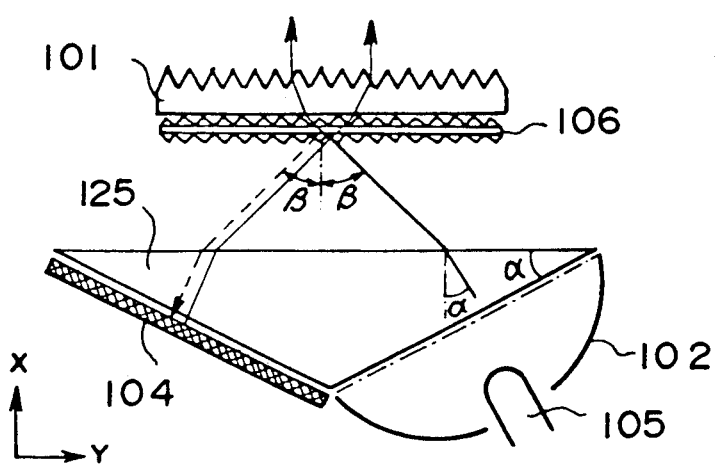

The above problem can be prevented by the preferred embodiments shown in FIGS. 30, 31 and 32.

In the preferred embodiments shown in FIGS. 30 and 32, prisms 123 and 125 are located before the polarization beam splitter 106, respectively, so as to suppress an increase in beam width. In the preferred embodiment shown in FIG. 21, the increase in beam width is (1/cos 45°) = 1.414. To the contrary, in the preferred embodiments shown in FIGS. 30 and 32, the increase in beam width is (1/cos 28.33°) = 1.136 assuming that the refractive index n of the prisms 123 and 125 is 1.49.

FIG. 31 shows a modification of the preferred embodiment shown in FIG. 32. That is, a polarization beam splitter 124 is substituted for the polarization beam splitter 106 used in FIG. 32. The polarization beam splitter 124 has a shape of quadrangular prism having a pair of trapezoidal side surfaces formed with upper and lower rows of rectangular prism elements. In this preferred embodiment, the polarizaton beam splitter also serves as a light conductor.

A further preferred embodiment is realized by substituting the combination of a ¼ wave plate and a plane mirror for a prism reflecting surface to be used in preferred embodiments of FIGS. 21 and 22 to be described below, and another preferred embodiment is realized by additionally locating a phase plate before the prism reflecting surface to be used in the preferred embodiments of FIGS. 21 and 22.

Figure 40:
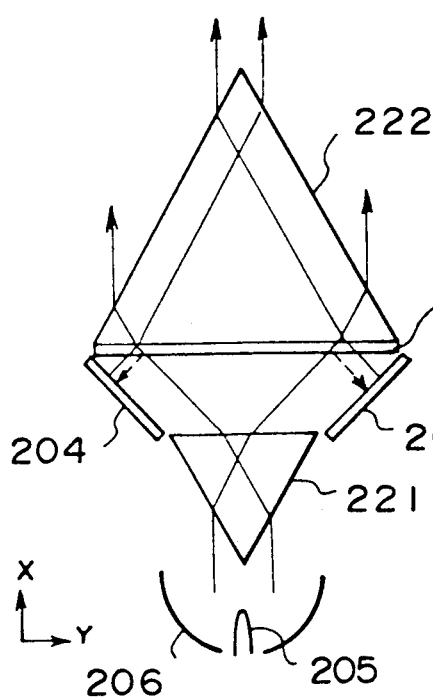

In the preferred embodiment shown in FIG. 40, rays of light from a light source 205 are made parallel by a curved mirror 206. The parallel rays of light are divided into two beams by a prism 221. Each beam enters a mirror type polarization beam splitter 203. A p-polarization component (shown by a solid line in the drawing) of the incident light on the splitter 203 is transmitted through the polarization beam splitter 203, and is then refracted by a prism 222 to outgo therefrom. On the other hand, an s-polarization component (shown by a dashed line in the drawing) of the incident light on the splitter 203 is reflected on the splitter 203 to reach a prism reflecting surface 204. Upon reflecting on the prism reflecting surface 204, a plane of polarization of the s-polarization component is rotated at 90° to obtain a p-polarized light which is in turn transmitted through the splitter 203. Then, the polarized light is refracted by the prism 222 to outgo therefrom. Thus, the above four outgoing light beams are parallel and adjacent to each other, and they can be therefore utilized as a single linear polarized light beam.

Figure 41:
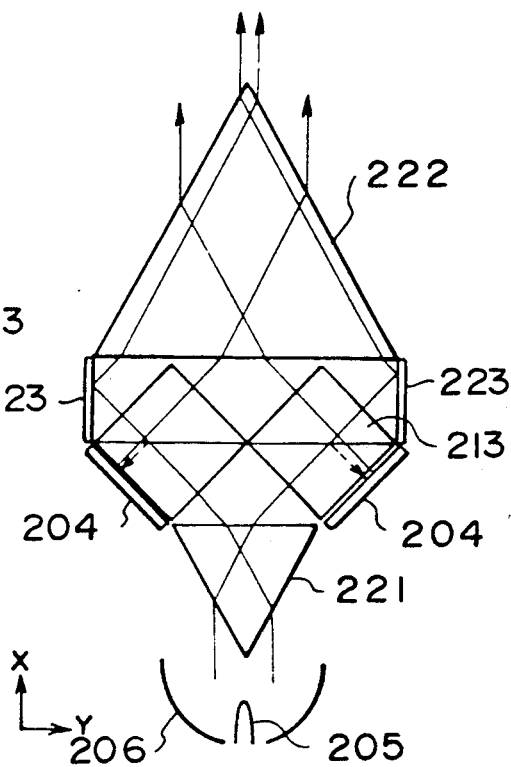

In the preferred embodiment shown in FIG. 41, a prism type polarization beam splitter 213 is substituted for the mirror type polarization beam splitter 203 used in FIG. 40. Further, as the prism type splitter is used, a pair of reflecting mirrors 223 are located between the splitters 213 and the prism 222 to obtain the same effect as that of the preferred embodiment shown in FIG. 40.

Figure 33:
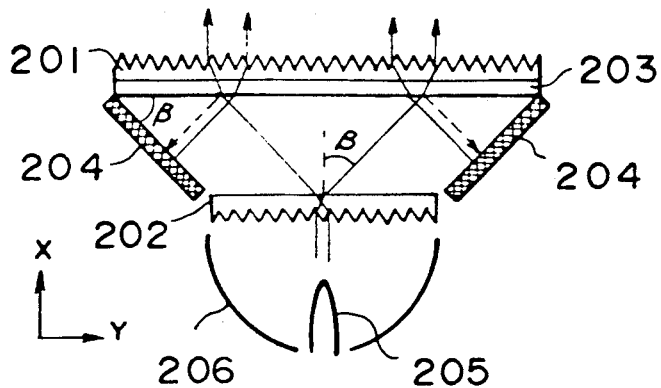
FIGS. 33 to 37 and 40 to 43, are plan views of the polarization forming optical device according to the present invention.
Figure 34:
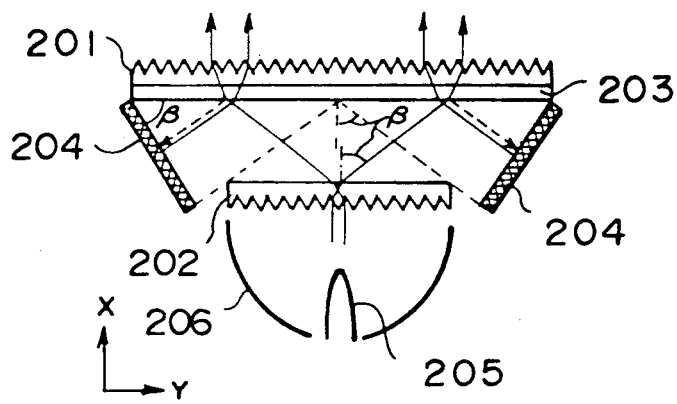
Figure 35:
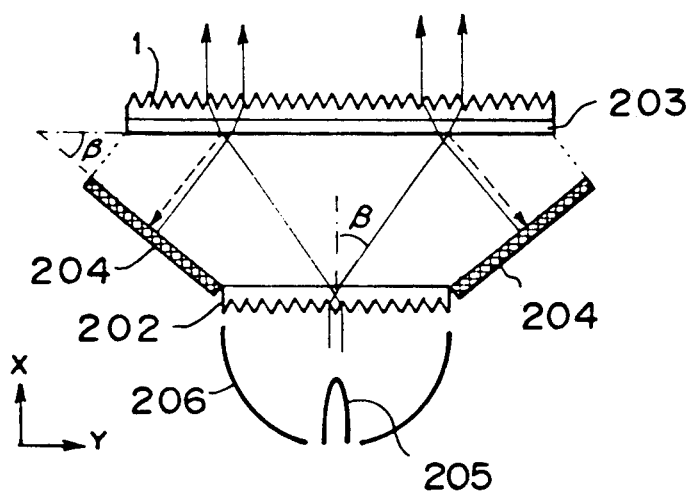
Figure 38:
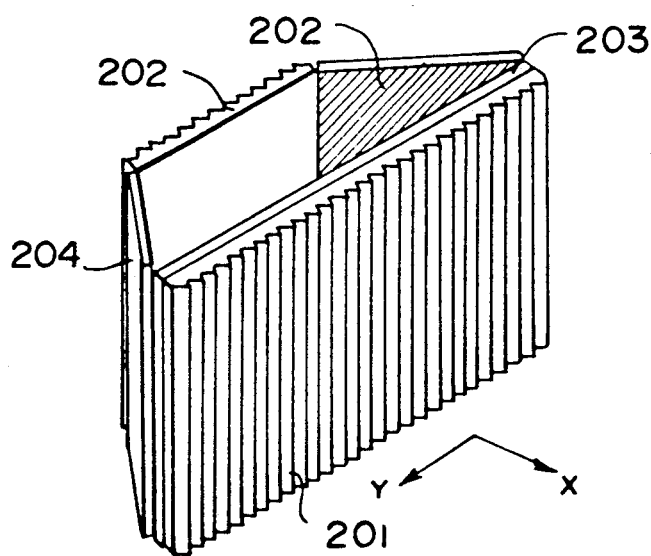
FIG. 38 is a perspective view of FIG. 33.

FIGS. 33 to 35, 42 and 43 are plan views, and FIG. 38 is a perspective view of FIG. 33.

Further preferred embodiments are realized by substituting a prism formed plate for at least one of the first prism 221 and the second prism 222 shown in FIGS. 40 and 41, so as to make the device compact.

In the preferred embodiment shown in FIG. 33, prism formed plates 202 and 201 are substituted for the prisms 221 and 222 shown in FIG. 40, respectively. In the preferred embodiment shown in FIG. 42, prism formed plates 202 and 201 are substituted for the prisms 221 and 222 shown in FIG. 41, respectively.

The prism formed plate 202 is constructed in such a manner that an upper surface of the plate 202 facing the polarization beam splitter 203 or 213 is a plane surface, and a lower surface of the plate 202 facing the light source 205 is formed with a plurality of small prism elements similar to the prism 221 shown in FIG. 40 or 41, which prism elements are arranged in parallel rows. Similarly, the prism formed plate 201 is constructed in such a manner that a lower surface of the plate 201 facing the polarization beam splitter 203 or 213 is a plane surface, and an upper surface of the plate 201 is formed with a plurality of small prism elements similar to the prism 222 shown in FIG. 40 or 41, which prism elements are arranged in parallel rows.

Although one of the first prism 221 and the second prism 222 may be replaced by the prism formed plate 202 or 201 so as to effectively make the device compact, it is apparent that the device can be made effectively compact by replacing both the first and second prisms 221 and 222 with the prism formed plates 202 and 201.

Figure 44A:
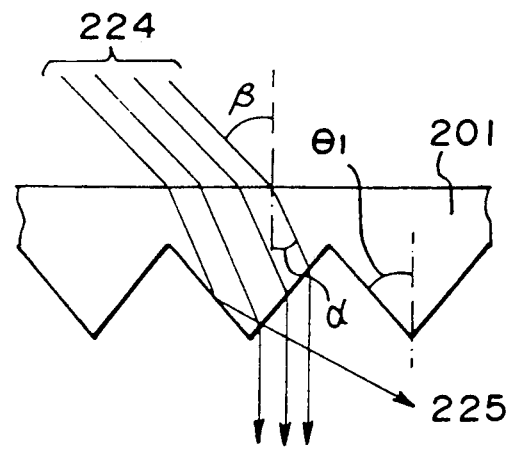
FIGS. 44A to 45B are illustrations of transmission of light through the prism formed plate.
Figure 44B:
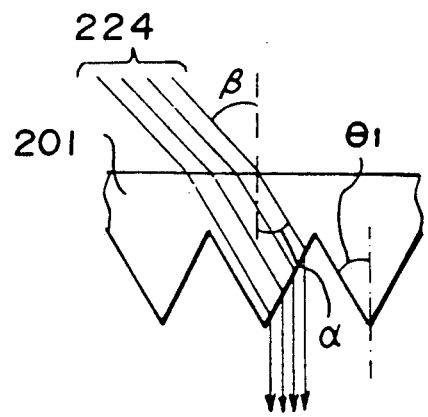

Assuming that X-axis and Y-axis are defined as shown in FIGS. 33 to 35 and 40 to 43, the condition of making the rays of outgoing light from the second prism 222 or the prism formed plate 201 into parallel rays of light is that an angle $\theta_1$ defined between the X-axis and one of the surfaces of the second prism 222 or each prism element of the prism formed plate 201 satisfies the following equation (5).

$$n_1 \sin \alpha = \sin \beta$$

$$n_1 \cos (\alpha + \theta_1) = \cos \theta_1 \quad (5)$$

where $\beta$ represents an incident angle of an incident light 224 as shown in FIGS. 44A and 44B, and $n_1$ represents a refractive index of the prism 222 or the prism formed plate 201.

It is understood that the larger the refractive index $n_1$, the larger the angle $\theta_1$. However, if the angle $\theta_1$ is too large, there is undesirably generated a loss light 225 as shown in FIG. 44A. Therefore, the angle $\theta_1$ is preferably set at an angle $\theta_0$ or less for making a refracted light parallel to one of the surfaces of the prism 222 or each prism element of the prism formed plate 201 as shown in FIG. 44B. The angle $\theta_0$ is obtained from the following equation (6).

$$\theta_0 = \cos^{-1} [\{1 + (1 + 8n_1^2)^{\frac{1}{2}}\}/4n_1] \quad (6)$$

Figure 45A:
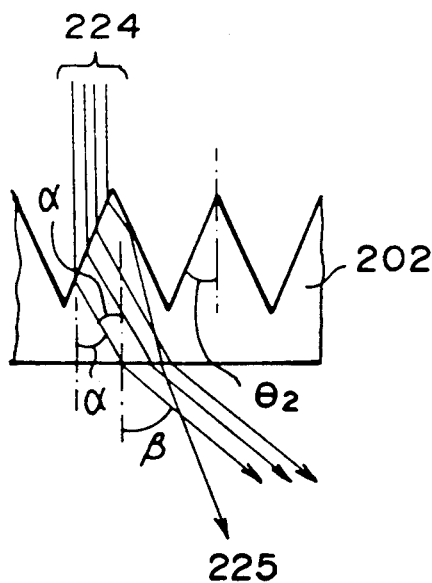
Figure 45B:
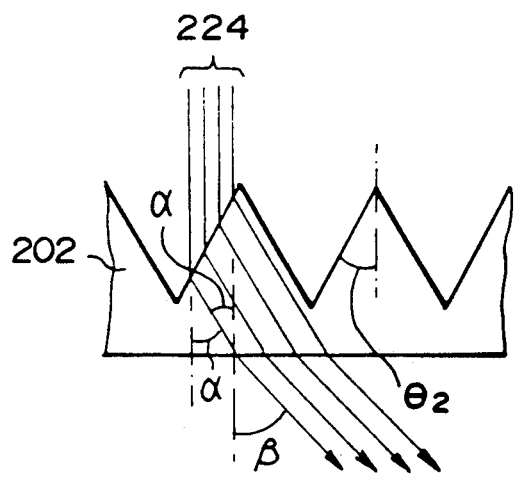

Furthermore, if an angle $\theta_2$ defined between the X-axis and one of the surfaces of the first prism (on the incident side) 221 or each prism element of the prism formed plate 202 is too small, there is undesirably generated a loss light 225 as shown in FIG. 45A. Therefore, the angle $\theta_2$ is preferably set to an angle $\theta_0'$ or more for making the refracted light parallel to one of the surfaces of the prism 221 or each prism element of the prism formed plate 202 as shown in FIG. 45B. The angle $\theta_0'$ is obtained from the following equation (7) assuming that the refractive index of the prism 221 or the prism formed plate 202 is represented by $n_2$.

$$\theta_0' = \cos^{-1} [\{1 + 8n_2^2)^{\frac{1}{2}}\}/4n_2] \quad (7)$$

In the case where the refractive index $n_1$ of the prism formed plate 201 is equal to the refractive index $n_2$ of the prism formed plate 202, it is most preferable in efficiency to set $\theta_0 = \theta_0' = \theta_1 = \theta_2$. On the other hand, in the case where the refractive index $n_1$ of the prism formed plate 201 is different from the refractive index $n_2$ of the prism formed plate 202, the angles $\theta_1$ and $\theta_2$ can be decided so as to satisfy the above conditions by setting $n_1 < n_2$.

In the preferred embodiments shown in FIGS. 33 to 35 and 40 employing the mirror type polarization beam splitter, the incident angle $\beta$ can be set freely to some extent. For example, the preferred embodiment shown in FIG. 33 corresponds to $\beta = 45°$; the preferred embodiment shown in FIG. 34 corresponds to $\beta > 45°$; and the preferred embodiment shown in FIG. 35 corresponds to $\beta < 45°$.

Figure 42:
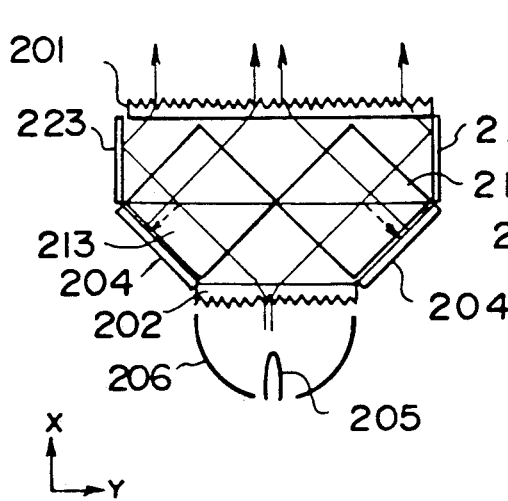
Figure 43:
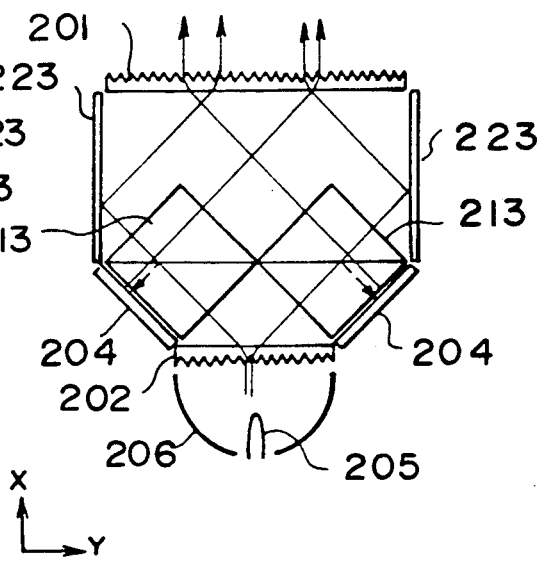

In the preferred embodiments shown in FIGS. 41 to 43 employing the prism type polarization beam splitter, it is preferable that $\beta = 45°$ is set. Accordingly, the following conditions must hold in FIG. 45B.

$$\cos \theta_2 = n_2 \cos (\alpha + \theta_2)$$

$$n_2 \sin \alpha = \sin 45°$$

$$\alpha \leq \theta_2$$

As apparent from the above conditions, $n_2 \geq 1.538$ is preferable.

It is apparently understood that the preferred embodiment shown in FIG. 33 employing the mirror type polarization beam splitter is superior in compactness to the preferred embodiment shown in FIG. 42 employing the prism type polarization beam splitter. Further, in the preferred embodiment shown in FIG. 42, the light component first transmitted through the polarization beam splitter 213 from the prism formed plate 202 outgoes from an outside portion of the prism formed plate 201, and the light component secondly transmitted through the polarization beam splitter 213 after reflection on the prism reflecting surface 204 outgoes from a central portion of the prism formed plate 201. As a result, there sometimes appears a difference in intensity or color between both the outgoing lights from the prism formed plate 201. Such a problem can be prevented by changing a position of the prism formed plate 201 as shown in FIG. 43. However, the preferred embodiment shown in FIG. 43 is disadvantageous in compactness of the device.

Figure 36:
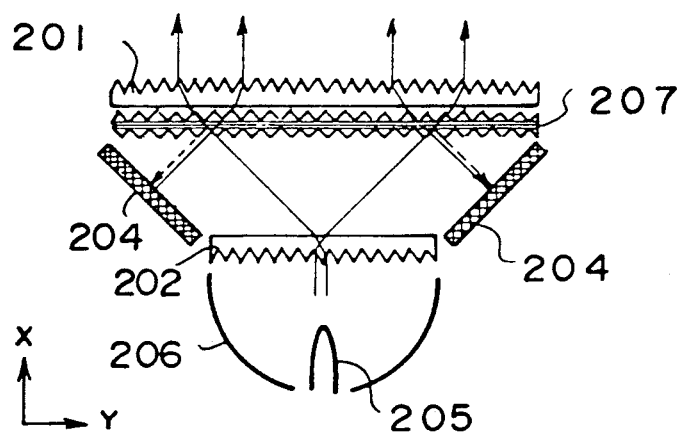
Figure 37:
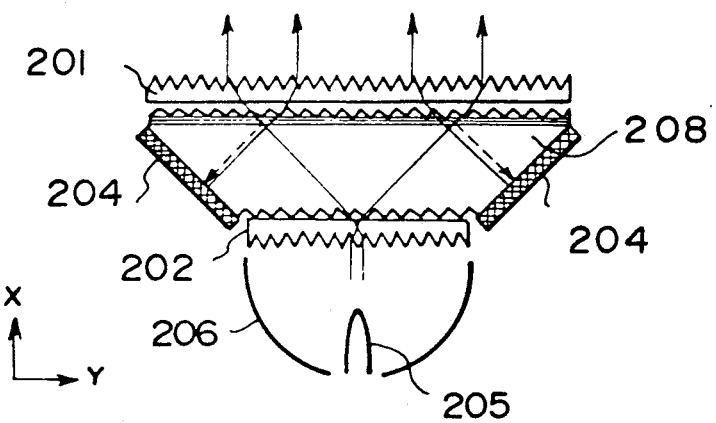

The preferred embodiments shown in FIGS. 36 and 37 is realized by applying the polarization beam splitter of FIGS. 9A-B to a device similar to the preferred embodiments of FIGS. 21 and 22.

In the preferred embodiment shown in FIG. 36, a polarization beam splitter 207 similar to that shown in FIG. 9 is employed, and the incident angle β is set to 45°, so that the device of this preferred embodiment can be used similarly to that shown in FIG. 33.

Figure 39:
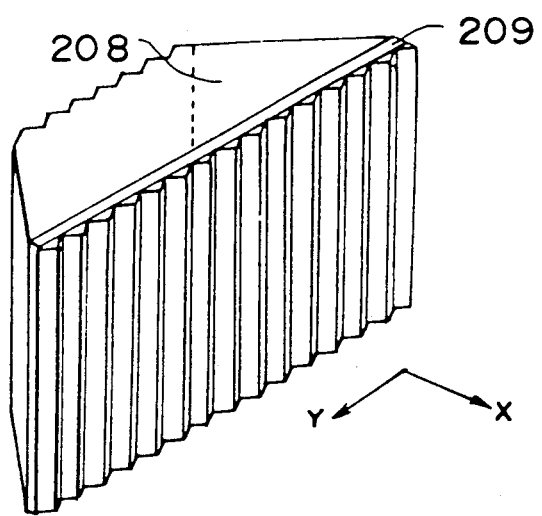
FIG. 39 is a perspective view of the polarization beam splitter according to the present invention.

In the preferred embodiment shown in FIG. 37, a polarization beam splitter 208 integrally formed with a light conductor shown in FIG. 39 is employed. The preferred embodiment shown in FIG. 37 is different from the preferred embodiment shown in FIG. 36 in the point that an incident surface substantially contacts the prism formed plate 202, and an optical path in the device is almost present in the polarization beam splitter 208. A position of an incident prism surface of the polarization beam splitter 208 is not limited to the position shown in FIG. 37 but it may be located at an intermediate position between the position shown in FIG. 37 and the position shown in FIG. 36.

Figure 46:
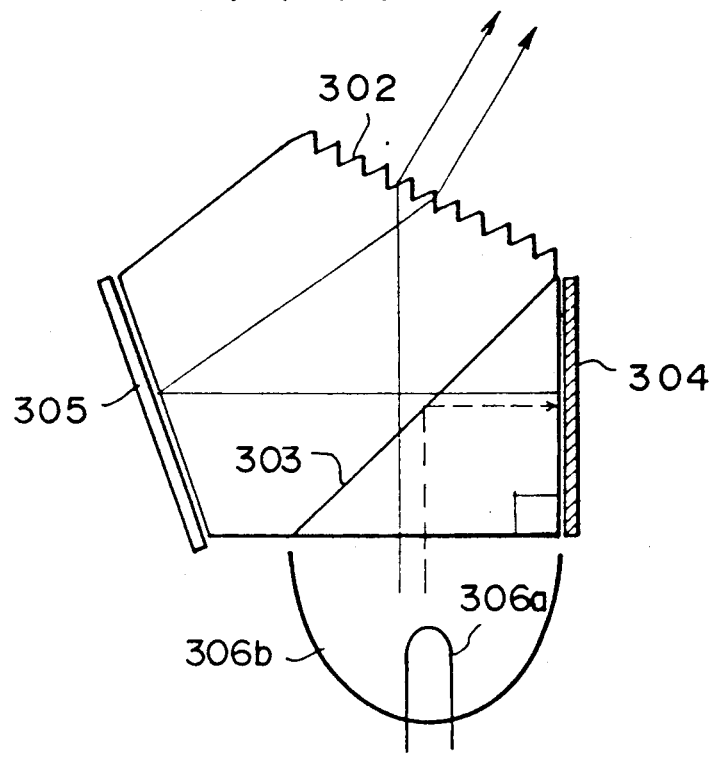
FIGS. 46, 47, 49, 52, 53 and 55 to 57 are plan views of the polarization forming optical device according to the present invention.
Figure 47:
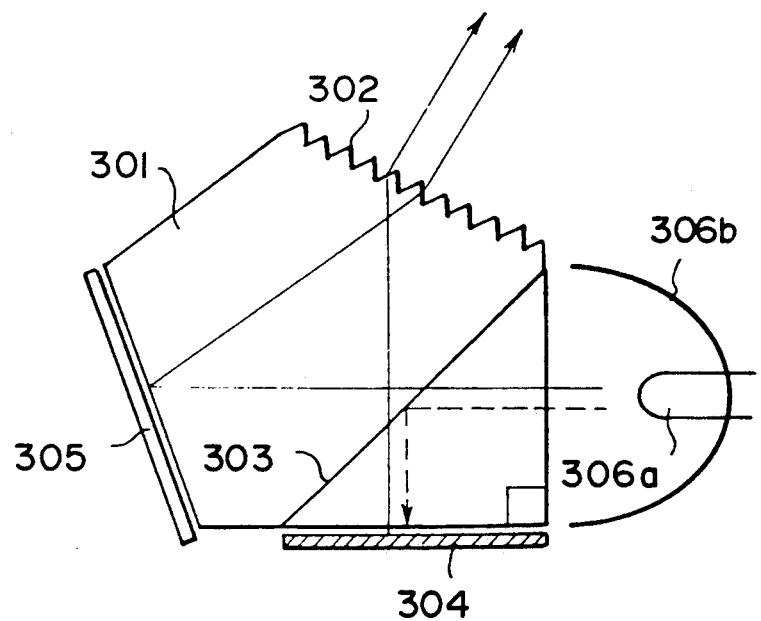

A preferred embodiment is realized by substituting the combination of a ¼ wave plate and a plane mirror for a prism reflecting surface to be used in preferred embodiments of FIGS. 46 and 47, and a preferred embodiment is realized by additionally locating a phase plate before the prism reflecting surface to be used in the preferred embodiments of FIGS. 46 and 47.

Figure 48:
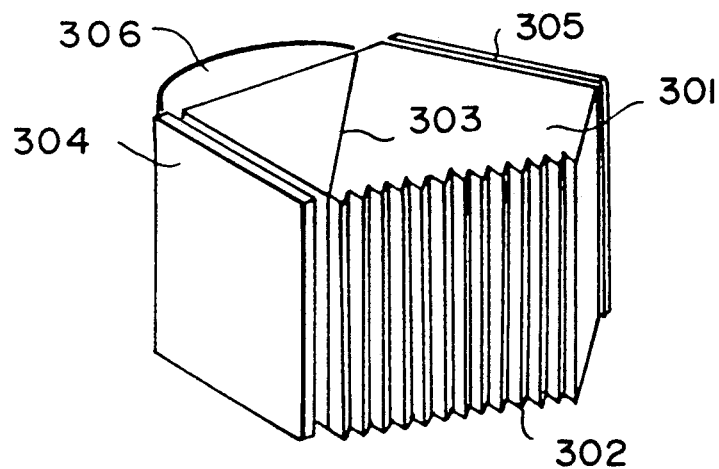
FIG. 48 is a perspective view of FIG. 46.

FIGS. 46 and 47 are plan views, and FIG. 48 is a perspective view of FIG. 46.

In the preferred embodiment shown in FIG. 46, rays of light from a light source 306a are made parallel by a curved mirror 306b. The parallel rays of light enter a polarizing film 303. A p-polarization component of the incident light on the polarizing film 303 is transmitted therethrough to reach a synthesizer prism 302 consisting of a plurality of small prism elements arranged in parallel rows. Then, the p-polarization component is refracted by the synthesizer prism 302 to outgo therefrom. On the other hand, an s-polarization component of the incident light on the polarizing film 303 is reflected thereon to reach a prism reflecting surface 304. Upon reflecting on the prism reflecting surface 304, the s-polarization component is converted into a p-polarized light which is in turn transmitted through the polarizing film 303 to reach a reflecting mirror 305. After reflecting on the reflecting mirror 305 to change an advancing direction, the p-polarized light reaches the synthesizer prism 302, and is refracted thereby to outgo therefrom.

Each of the prism elements of the synthesizer prism 302 is formed by two surfaces inclined at a given angle. Assuming that an angle defined between one of the two surfaces of the prism element and an advancing direction of an outgoing light from the surface of the prism element is represented by θ, and that an angle defined between the surface of the prism element and an advancing direction of an incident light on the surface of the prism element is represented by φ, the following equation is given.

$$n \cos \phi = \cos \theta \quad (8)$$

where n represents a refractive index of the synthesizer prism.

The incident light on one of the two surfaces of each prism element after transmission through the polarizing film 303 directly from the light source 306a is refracted by the prism element in accordance with the above equation (8), while the incident light on the other surface of the prism element after reflection on the reflecting mirror 305 is refracted by the prism element in accordance with the above equation (8), so that the advancing directions of the outgoing light beams based on both the incident light beams are made coincident with each other.

To make the advancing directions of both the outgoing light beams coincident with each other, it is necessary to set the angles φ and θ to suitable values. However, it is sufficient to simply make the angle φ of the first outgoing light beam equal to that of the second outgoing light beam and make the angle θ of the first outgoing light beam equal to that of the second outgoing light beam (however, signs of the angles φ and θ depend on a manner of taking these angles). Further, it is preferable to make a normal to a plane of arrangement of the rows of the prism elements coincident with the advancing directions of both the outgoing light beams. Accordingly, both the outgoing light beams can be uniformly mixed with each other to thereby prevent the generation of non-uniformity of brightness and color.

Figure 57:
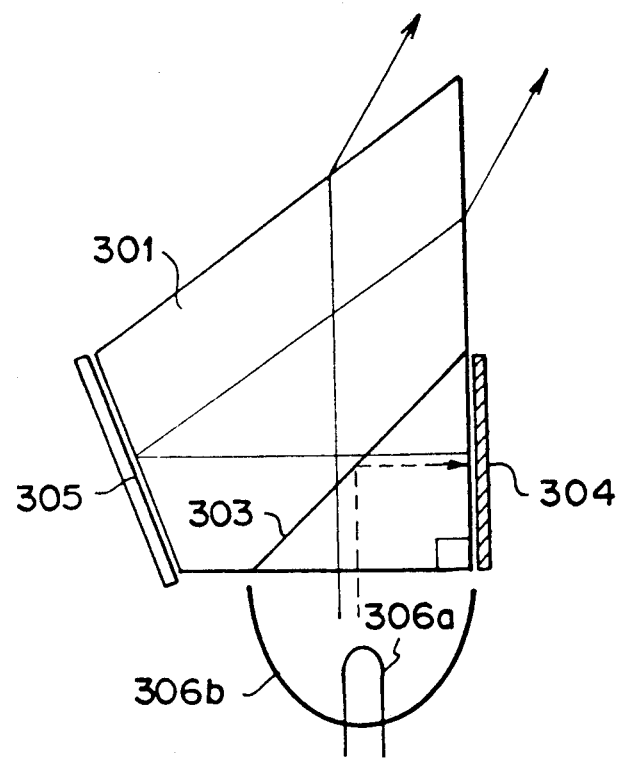

FIG. 57 shows one of the preferred embodiments of FIGS. 46 and 47, which is realized by substituting a single prism 301 for the rows of the prism elements shown in FIG. 46. The preferred embodiment shown in FIG. 57 is somewhat disadvantageous as compared with the preferred embodiment shown in FIG. 46 from the viewpoints that a size of the prism is large, and that the outgoing light beam based on the transmitted light through the polarizing film 303 directly from the light source 306a is separate from the outgoing light beam based on the reflected light beam on the reflecting mirror 305 with respect to an intersection between both the surfaces of the prism 301. Furthermore, a reflectance of the s-polarized light on the polarizing film 303 is not strictly equal to a transmittance of the p-polarized light through the polarizing film 303. Additionally, the outgoing light beam based on the reflected light from the reflecting mirror 305 is reduced in intensity due to loss on the prism reflecting surface 304, incompleteness of rotation of the plane of polarization on the prism reflecting surface 304 (depending on a wavelength), and loss on the reflecting mirror 305 (10-20% in case of Al deposition; 5-10% in case in Ag deposition). As a result, there is generated a change in spectrum of the outgoing light. Thus, the preferred embodiment shown in FIG. 57 is undesired from the viewpoint of non-uniformity of intensity and color of the outgoing light.

A period of arrangement of the prism elements shown in FIG. 46 is not strictly uniform to cause the above problem. However, while the non-uniformity of intensity and color of the outgoing light depends on a broadening angle of the outgoing light, it can be made almost disappear by sufficiently reducing the period of arrangement of the prism elements.

The angle θ which defines a shape of the synthesizer prism is set in the following manner.

Figure 54A:
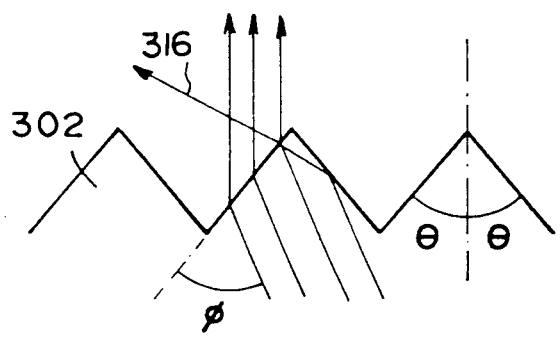
FIGS. 54A and 54B are an illustration of transmission of light through the light synthesizer prism.
Figure 54B:
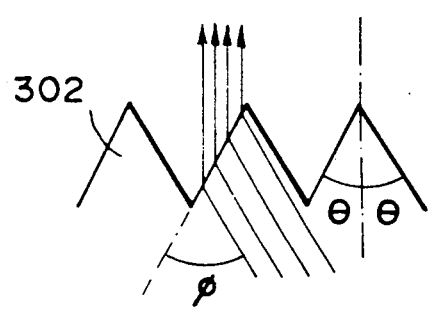

If the angle θ is too large as shown in FIG. 54A, a part of the incident light is reflected on the opposite surface of the prism element to generate an outgoing light 316 different in advancing direction. As a result, parallel light beams cannot be obtained to cause a reduction in efficiency. To avoid this problem, the angle θ must satisfy $\phi \geq 2\theta$. Accordingly, the following condition must be satisfied.

$$n \cos 2\theta \geq n \cos \phi = \cos \theta \quad (9)$$

$$\theta \leq \cos^{-1}[\{1+(1+8n^2)^{\frac{1}{2}}\}/4n] \quad (10)$$

In designing the prism, the angle $\theta$ is decided so as to satisfy the above expression (10) according to a refractive index n of the prism. Further, the angle $\phi$ is obtained from the equation (8), so that a position and an angle of the reflecting mirror 305 can be decided. However, the smaller the angle $\theta$, the large an angle of refraction to expand a broadening angle of the outgoing light beam and thereby reduce a converging efficiency. Therefore, it is preferable from this point of view that the equality is to hold in the expression (10).

Meanwhile, a width of the outgoing light beam is enlarged by the (1/ cos $\theta$) times that of the incident light beam. Accordingly, the smaller the angle $\theta$, the smaller the magnitude of enlargement of the width of the outgoing light beam.

In the case of using polymethylmethacrylate (n=1.49) for the material of the prism, $\theta=26.5°$ is obtained from the equality in the expression (10). Accordingly, the magnitude of enlargement of the beam width is 1.12. The preferred embodiment shown in FIG. 46 corresponds to this case, and it is appreciated that the enlargement of the beam width is small.

The preferred embodiment shown in FIG. 47 is realized by exchanging the position of the light source 306a for the position of the prism reflecting surface 304 and vice versa in the preferred embodiment shown in FIG. 46. The preferred embodiment shown in FIG. 47 has the same function as that of the preferred embodiment shown in FIG. 46. Either the preferred embodiment shown in FIG. 46 or the preferred embodiment shown in FIG. 47 may be suitably selected according to a desired layout. However, the case of the application to a liquid crystal projector, the preferred embodiment shown in FIG. 46 is preferable since a heat source (light source) should be separate from a liquid cyrstal light bulb (to be located adjacent the prism 302).

Figure 56:
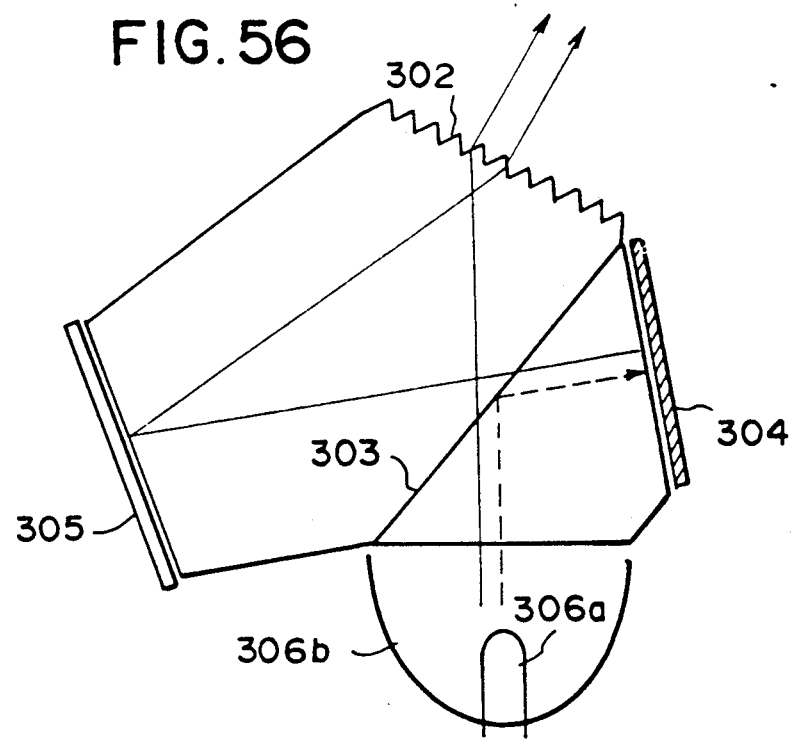

The polarizing film 303 shown in FIGS. 46 and 47 is the same as that employed in a normal polarization beam splitter. That is, the polarizing film 303 is a dielectric multi-layer film formed by alternately laminating a substance having a high refractive index and a substance having a low refractive index so as to make an angle of refraction equal to a Brewster's angle. This film has a property of transmitting a p-polarized light only and reflecting an s-polarized light. An incident angle of the light from the light source 306a onto the polarizing film 303 is set to 45° in general. However, the incident angle is not necessarily limited to 45°. In the preferred embodiment shown in FIG. 56, the incident angle is greater than 45°. The incident angle which can provide the best performance is dependent upon a refractive index of a transparent material to be used and a refractive index of a deposition material of the multi-layer film. Accordingly, the incident angle is not always set to 45°. However, the incident angle is practically set to 45° as similar to the normal polarization beam splitter for easiness of designing and compactness of the device.

Figure 53:
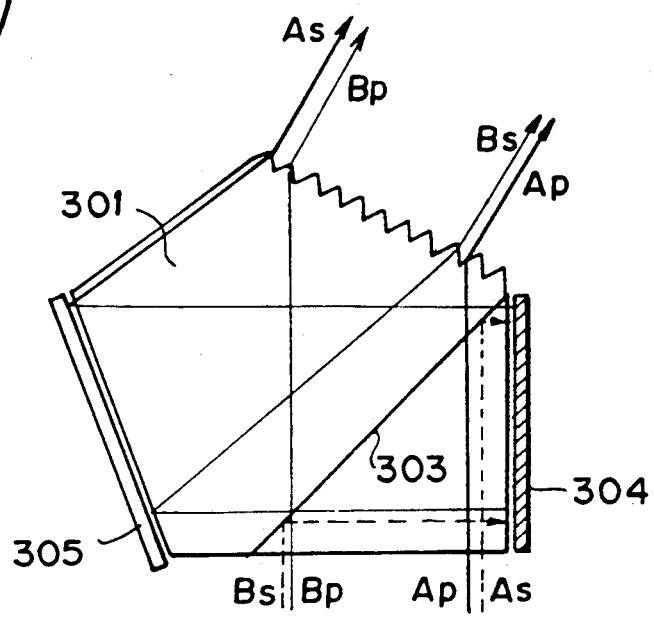

The above preferred embodiments as shown in FIGS. 46 and 47 have a mixing function as an additional function. As shown in FIG. 53, an s-polarization component As (Bs) and a p-polarization component Ap (Bp) of the incident light entering one end portion of the polarizing film 303 are allowed to outgo from the prism at opposite end portions thereof. In other words, the outgoing light ray based on the s-polarization component and the outgoing light ray based on the p-polarization component are allowed to advance at mirror symmetrical positions with respect to a center of the outgoing beam. Accordingly, if the incident light is not uniform in brightness according to an incident position, such non-uniformity can be reduced by the above-mentioned mixing function.

Figure 49:
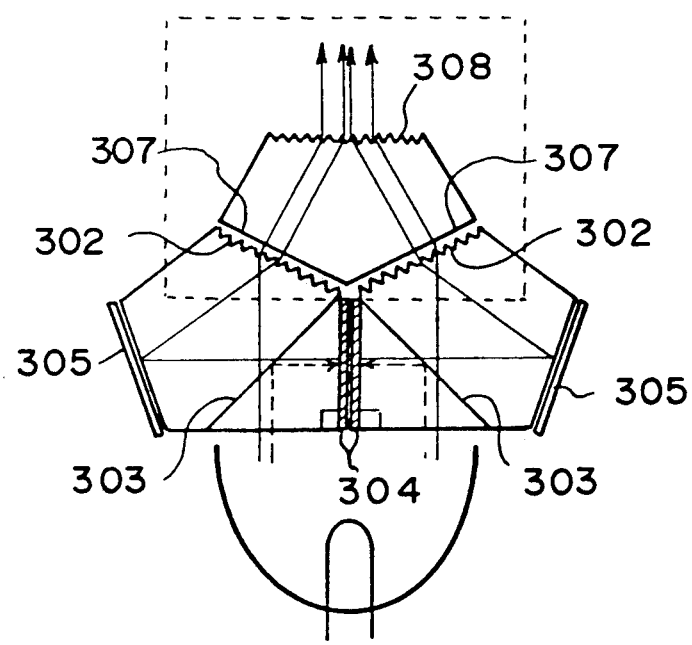

The device shown in FIG. 49 effectively utilizes the above mixing effect and further improves the compactness.

In general, light to be formed by a lamp with a mirror or a combined lens and bulb has a distribution of brightness symmetrical with respect to an optical axis. In this regard, a reduction in non-uniformity of the brightness by the above mixing function only is not so effective. To cope with this, the preferred embodiment shown in FIG. 49 is constructed by symmetrically disposing two sets of the units each similar to the device shown in FIG. 46 (however, the light source is common), and further providing a prism 308 for synthesizing the outgoing beams from both the units. With this construction, the mixing effect is utilized for halves of the incident beam from the light source, each half tending to be unsymmetrical in brightness. The mixing is also carried out in the prism 308.

Figure 50:
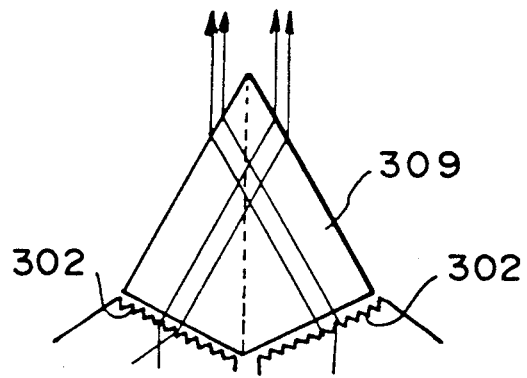
FIGS. 50 and 51 are plan views of a light synthesizing means to be used in the present invention.
Figure 51:
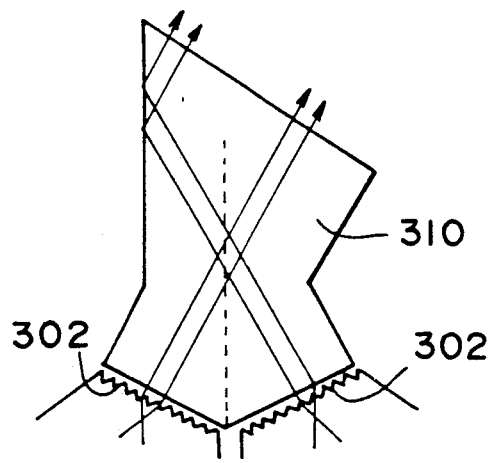

The prism 308 as a synthesizing means as shown in a part enclosed by a dashed line in FIG. 49 may be replaced by a single prism 309 as shown in FIG. 50 or a reflecting means 310 for making the advancing vectors coincident with each other.

In the preferred embodiment shown in FIG. 49, two prism reflecting surfaces 304 of both the units are disposed adjacent to each other, so that the rotation of the plane of polarization is effected by the reflection on the prism reflecting surfaces 304. The same function can be exhibited by replacing the two prism reflecting surfaces with a single $\frac{1}{2}$ wave plate as shown in FIG. 52.

Figure 52:
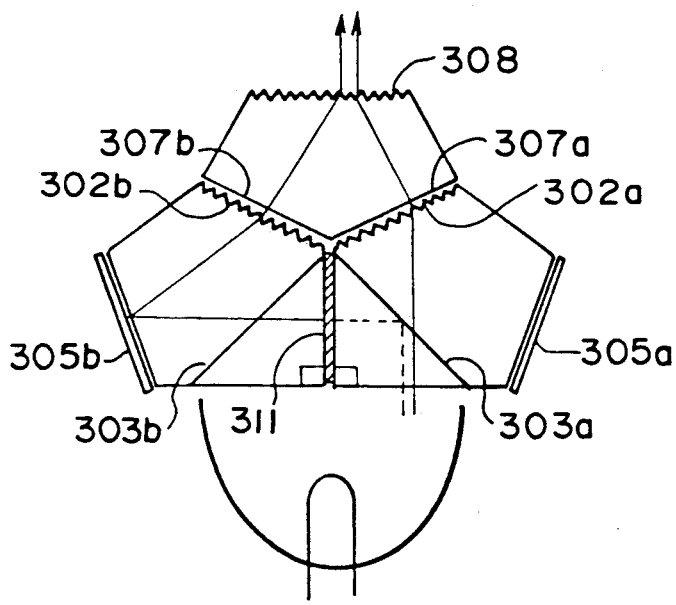

In the preferred embodiment of FIG. 52, an s-polarization component of light from a light source incident on a right unit is reflected on a polarizing film 303a, and is then transmitted through a $\frac{1}{2}$ wave plate 311, thereby rotating the plane of polarization of the s-polarization component at 90° to obtain a p-polarized light. The p-polarized light enters a left unit arranged in symmetrical relationship with the right unit, and is transmitted through a polarizing film 303b to reach a reflecting mirror 305b. After reflecting on the reflecting mirror 305b, the p-polarized light outgoes from a prism 302b, and enters a prism 308. On the other hand, a p-polarization component of the light from the light source incident on the right unit is transmitted through the polarizing film 303a to outgo from a prism 302a and enters the prism 308. Then, both the p-polarized lights are synthesized in the prism 308 to outgo therefrom. As to an incident light on the left unit from the light source, a synthesized p-polarized light beam is similarly obtained in the prism 308 to outgo therefrom.

The $\frac{1}{2}$ wave plate is disposed in such a manner that an optic axis thereof is inclined at 45° with respect to the plane of polarization, so that the rotation of the plane of polarization can be effected without dependency upon a direction of transmission of the light.

The prism 308 as a synthesizing means as shown in FIG. 52 may be replaced by a single prism 309 as shown in FIG. 50 or a reflecting means 310 for making the advancing vectors coincident with each other.

Figure 55:
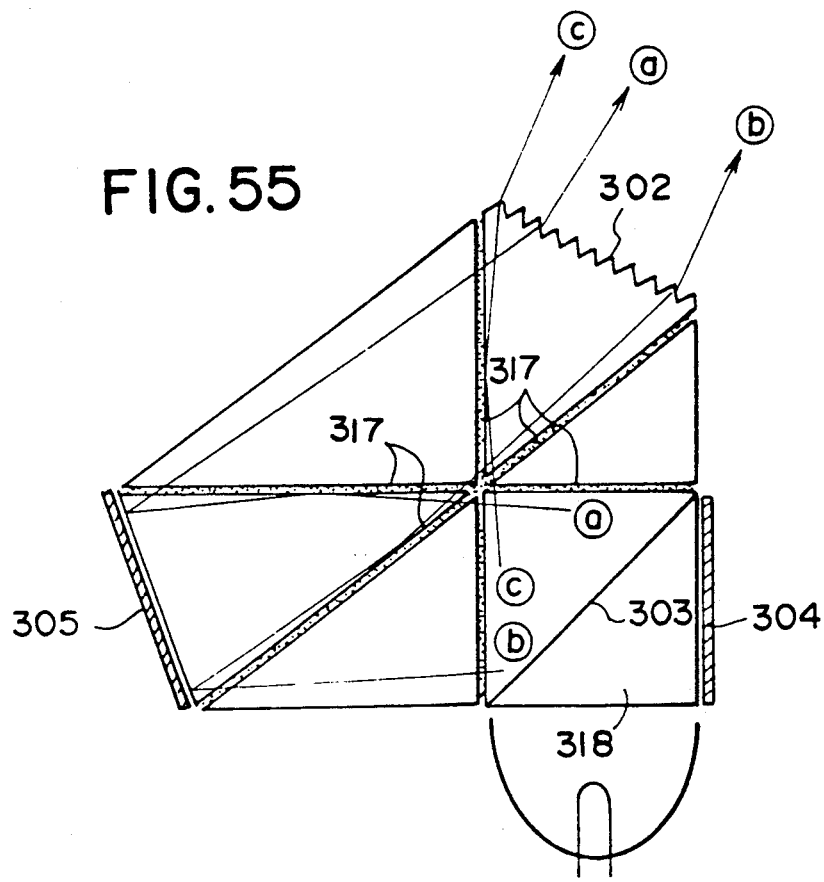

FIG. 55 shows a preferred embodiment similar to FIGS. 46 and 47 using a normal polarization beam splitter. The preferred embodiment shown in FIG. 55 is constructed of a polarization beam splitter 318, five triangular prisms, and a transparent adhesive 317 having a low refractive index for bonding the polarization beam splitter 318 and the five triangular prisms. One of the five triangular prisms has a synthesizer prism 302. With this construction, a broadening light beam is enclosed in the prisms by total reflection to form a light conductor. Therefore, the light from the light source can be efficiently conducted to the synthesizer prism 302. However, this preferred embodiment is inferior in compactness to the preferred embodiment shown in FIG. 46.

Figure 72:
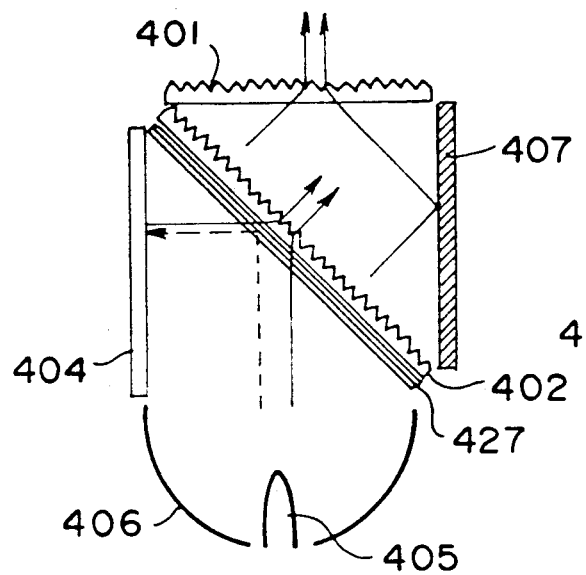

In the preferred embodiment shown in FIG. 72, rays of light from a light source 405 are made parallel by a curved mirror 406, and enter a mirror type polarization beam splitter 427 at an incident angle of 45°. A p-polarization component of the incident light on the polarization beam splitter 427 is transmitted through the polarization beam splitter 427, and is then refracted by a first prism formed plate 402 to outgo therefrom. On the other hand, an s-polarization component of the incident light on the polarization beam splitter 427 is reflected on the polarization beam splitter 427 to reach a prism reflecting surface 404. Upon reflecting on the prism reflecting surface 404, a plane of polarization of the s-polarization component is rotated at 90° to obtain a p-polarized light which is in turn transmitted through the polarization beam splitter 427, and is then refracted by the first prism formed plate 402 to outgo therefrom. The above two outgoing light beams from the first prism formed plate 402 can be made parallel by suitably selecting a shape and a refractive index of each small prism element of the first prism formed plate 402. The polarization beam splitter 427, the prism reflecting surface 404 and the first prism formed plate 402 constitute the polarizing portion according to the present invention.

A part of the outgoing light beams from the first prism formed plate 402 outgoing from a half portion of the first prism formed plate 402 enters the whole of a second prism formed plate 401 at an incident angle of 45°, and is then refracted by the second prism formed plate 401 to outgo therefrom. On the other hand, the other part of the outgoing light beams from the first prism formed plate 402 outgoing from the other half portion of the first prism formed plate 402 enters the whole of a reflecting mirror 407 at an incident angle of 45°, and is reflected on the reflecting mirror 407 to thereby change an advancing direction at 90°. Then, the reflected light from the reflecting mirror 407 enters the whole of the second prism formed plate 401 at an incident angle of 45°, and is then refracted by the second prism formed plate 401 to outgo therefrom. The above two outgoing light beams from the second prism formed plate 401 can be made parallel by suitably selecting a shape and a refractive index of each small prism element of the second prism formed plate 401. A width of the total outgoing light beam from the second prism formed plate 401 is the same as that of the incident light beam from the light source 405. The reflecting mirror 407 and the second prism formed plate 401 constitute the light beam synthesizing portion according to the present invention.

The first prism formed plate 402 or the second prism formed plate 401 is similar to the prism formed plate of FIGS. 20, 24, and 25, and the polarizing portion corresponds to the polarization forming optical device of FIG. 20.

Figure 77:
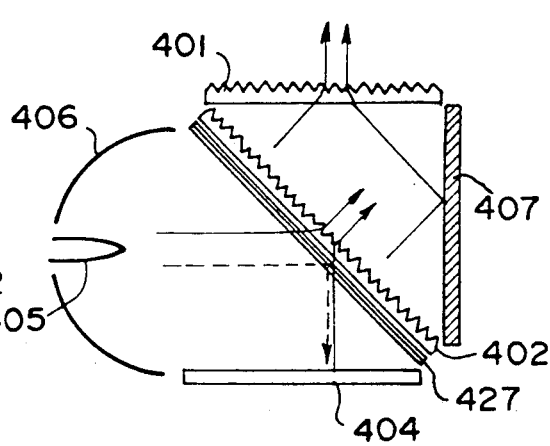

The preferred embodiment shown in FIG. 77 is realized by merely changing positions of the light source 405, the curved mirror 406 and the reflecting mirror 407 shown in FIG. 72. Accordingly, the function of the preferred embodiment shown in FIG. 77 is the same as that of the preferred embodiment shown in FIG. 72.

Figure 71:
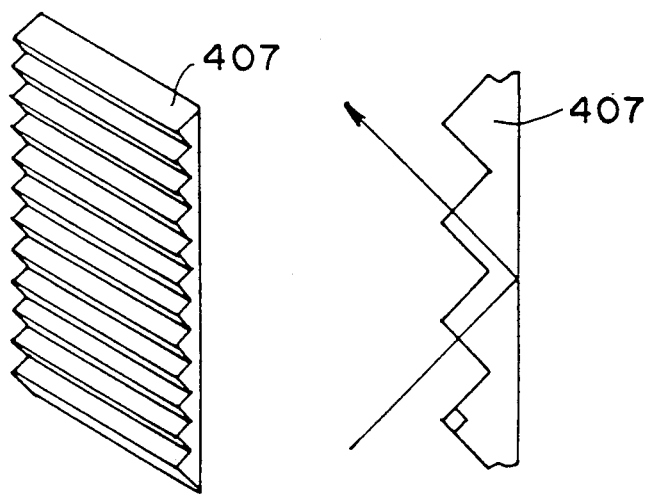
FIG. 71 is a view of a reflecting mirror to be used in the present invention.

The reflecting mirror 407 employed in FIGS. 72 and 77 is formed from a metal mirror or a dielectric multilayer film. Alternatively, as shown in FIG. 71, the reflecting mirror 407 may be a total reflecting mirror utilizing that the incident angle and the reflection angle are 45°. That is, the total reflecting mirror is constructed of a transparent plate having a refractive index of $2^{\frac{1}{2}}$ or more and a plurality of rectangular prism elements arranged in parallel rows formed on one surface of the transparent plate.

Figure 73:
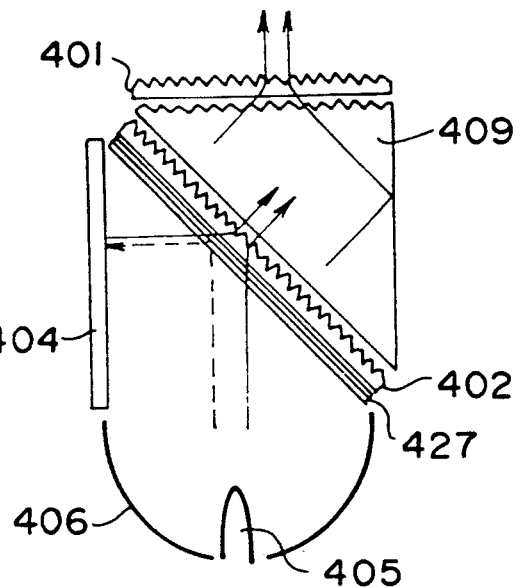
Figure 76:
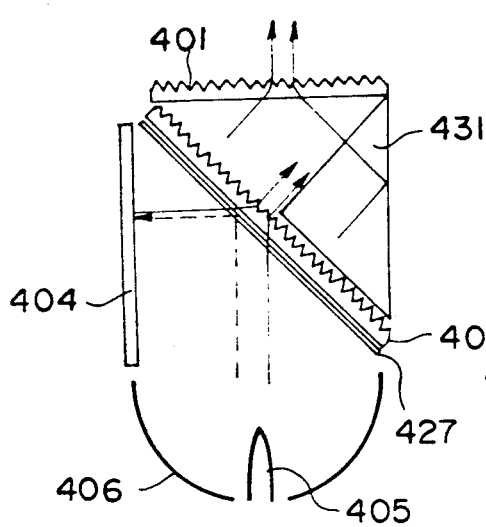

The preferred embodiments shown in FIGS. 73 and 76 utilize such a total reflecting mirror. In the preferred embodiment shown in FIG. 76, a single rectangular prism 431 is provided for the total reflecting mirror. In the preferred embodiment shown in FIG. 73, a single rectangular prism 409 formed with a plurality of prism element rows on the light outgoing surface is provided to face the first prism formed plate 402, so that the prism 409 also serves as a light conductor for the whole outgoing light from the first prism formed plate 402.

Figure 79:
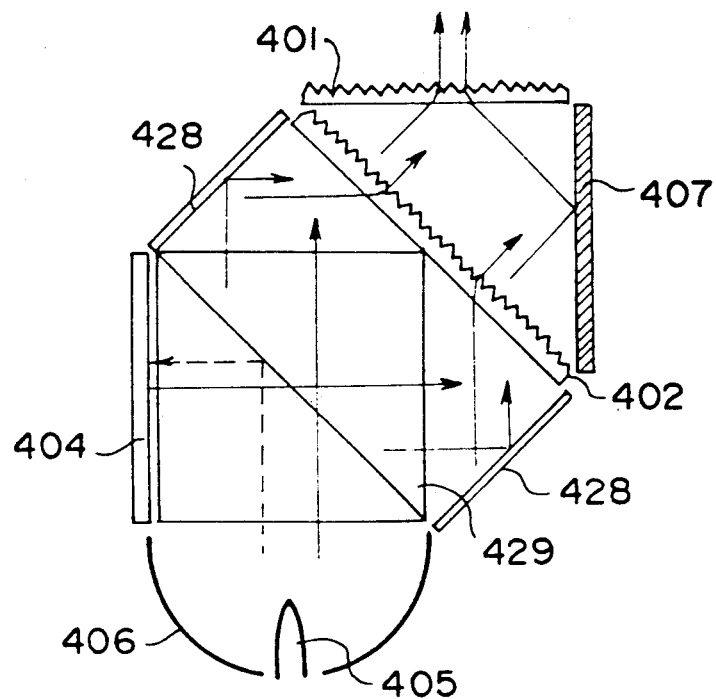
Figure 80:
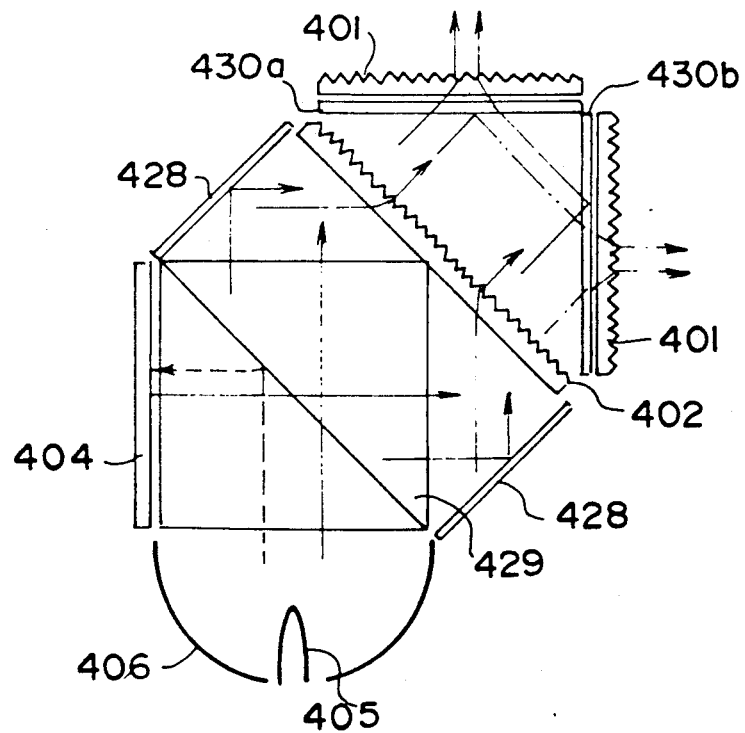

FIGS. 79 and 80 are plan views of further preferred embodiments. In these preferred embodiments, a prism type polarization beam splitter 429 is employed. Further, two reflecting mirrors 428 are employed. Each of the two reflecting mirrors 428 functions to guide a half part of an outgoing light beam from one of two outgoing surfaces of the prism type polarization beam splitter 429 to a half portion of the first prism formed plate 402. Each reflecting mirror 428 is suitably selected from a mirror similar to the reflecting mirror 407 shown in FIGS. 72 and 77, a total reflecting mirror as shown in FIG. 71, or a mirror similar to the rectangular prism 431 shown in FIG. 76.

The preferred embodiment shown in FIG. 80 employs two second prism formed plates 401 and two dichroic mirrors 430a and 430b to have a function of color separation by utilizing a wide band property of the prism type polarization beam splitter. For example, in the case that the dichroic mirror 430a is a mirror which transmits a red light and reflects green and blue lights, and that the dichroic mirror 430b is a mirror which transmits green and blue lights and reflects a red light, a red polarized light and a cyan polarized light are obtained, respectively.

Figure 58:
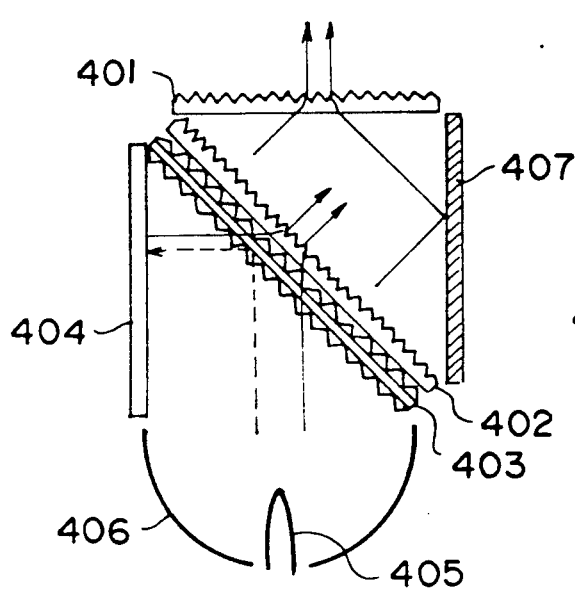
Figure 61:
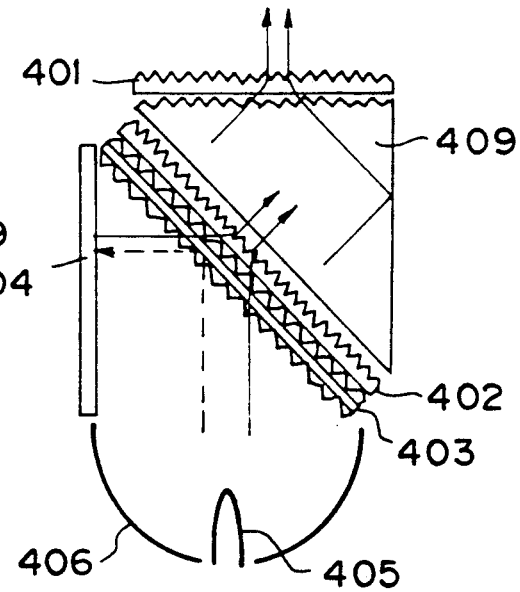

FIGS. 58 and 61 are plan views. The preferred embodiments shown in FIGS. 58 and 61 are realized by replacing the mirror type polarization beam splitter 427 shown in FIGS. 72 and 73 with the polarization beam splitter of FIGS. 9A-B, respectively.

Figure 59:
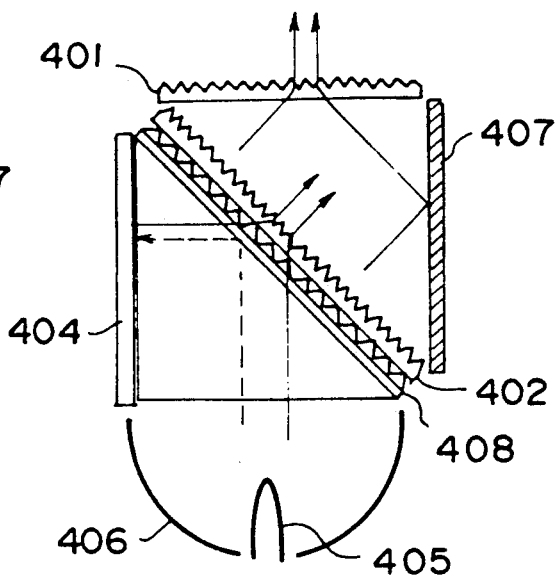
Figure 60:
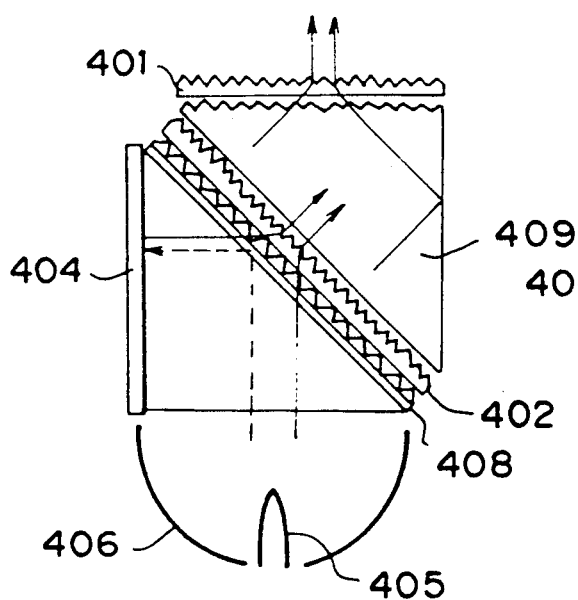
Figure 66:
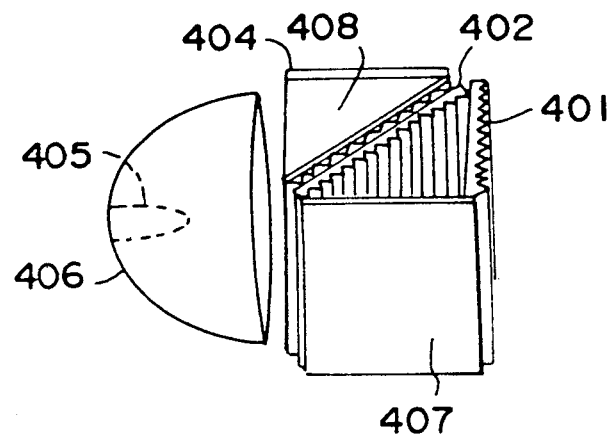
FIG. 66 is a perspective view of FIG. 59.

FIGS. 59 and 60 are plan views, and FIG. 66 is a perspective view of FIG. 59.

In the preferred embodiments shown in FIGS. 59 and 60, a polarization beam splitter 408 is the same as the polarization beam splitter shown in FIG. 10.

Figure 74:
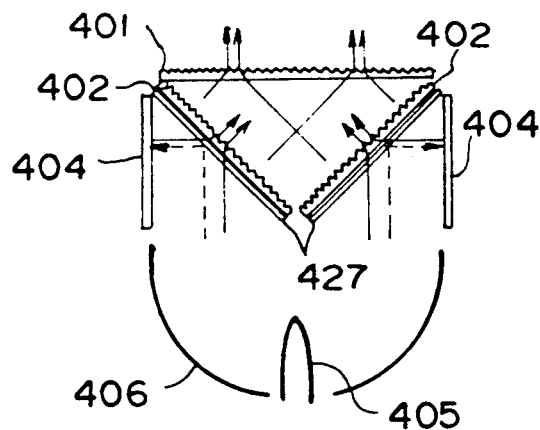

In the preferred embodiment shown in FIG. 74, two of the polarizing portion shown in FIG. 72 are arranged symmetrically so as to inwardly orient two outgoing light beams from the two polarizing portions. A second prism formed plate 401 is located at a position where the two outgoing light beams from the two polarizing portions intersect each other. The two outgoing light beams intersected above are synthesized by the prism formed plate 401.

As compared with a mere combination of two of the preferred embodiment shown in FIG. 72, the reflecting mirror 407 is eliminated in the preferred embodiment of FIG. 74, and an overall volume for obtaining the same cross section of the outgoing light beam as that in the preferred embodiment of FIG. 72 can be reduced to about ½. Furthermore, the preferred embodiment of FIG. 74 has a mixing function such that right and left portions of the incident light beam from the light source are mixed together on the outgoing surface of the prism formed plate 401 to thereby reduce non-uniformity of light quantity in the cross section of the incident light beam.

Figure 78:
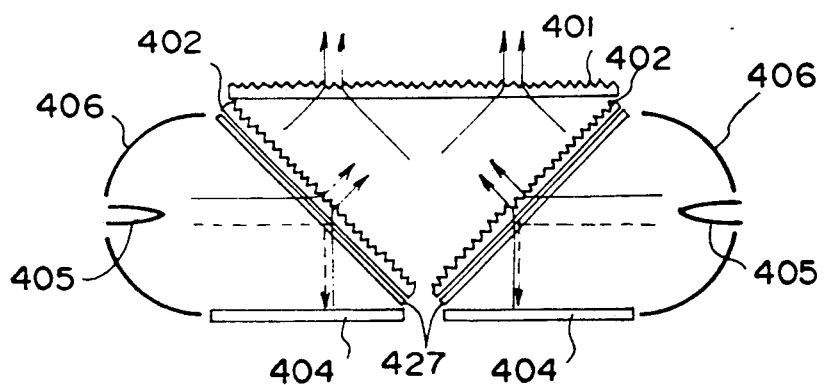

The preferred embodiment shown in FIG. 78 is realized by changing positions of the light source 405, the curved mirror 406 and the prism reflecting surfaces 404 shown in FIG. 74 and providing two of the light source 405 and the curved mirror 406. With this construction, each of the incident light beams from the two light sources 405 is allowed to outgo from the whole surface of the prism formed plate 401. Accordingly, even when one of the two light sources 405 is turned off, a distribution of the outgoing light beam is not almost changed but an intensity only is reduced. By utilizing this property, the intensity of the outgoing light beam can be changed in two or three stages (e.g., in the case of using two light sources having high and low intensities, three stages consisting of the low intensity only, the high intensity only and the low intensity plus the high intensity can be individually obtained by switching the two light sources). Alternatively, in the case of using two light sources having different colors, a tint of the outgoing light can be changed.

Figure 75:
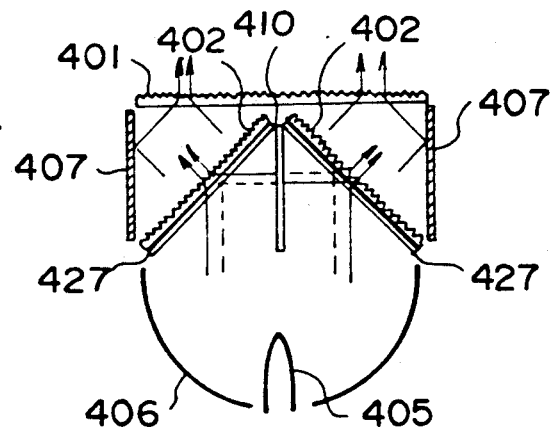

FIG. 75 is a plan view of a preferred embodiment. In this preferred embodiment, two of the device shown in FIG. 72 are arranged symmetrically with respect to a plane of the prism reflecting surface, and a single ½ wave plate 410 is substituted for the prism reflecting surface 404 shown in FIG. 72. Further, the light source 405, the curved mirror 406 and the second prism formed plate 401 are commonly used for the right and left polarizing portions. According to this preferred embodiment, the device can be made compact as similar to the preferred embodiment shown in FIG. 74.

In the preferred embodiments shown in FIGS. 62, 63 and 64, a polarization beam splitter 408 is the same as the polarization beam splitter shown in FIG. 10. Accordingly, the device can be made compact as similar to the case of using a mirror type polarization beam splitter.

The preferred embodiment shown in FIG. 64 is realized by changing a position of the second prism formed plate 401 shown in FIG. 63. With this construction, the outgoing light beams from the right and left polarizing portions are mixed together to thereby improve the mixing effect.

In the foregoing preferred embodiments, a phase plate may be located before the prism reflecting surface. Further, the prism reflecting surface may be replaced by the combination of a ¼ wave plate and a plane mirror.

FIG. 65 shows a preferred embodiment which reduces overall volume required for obtaining the same cross section of an outgoing light beam. This preferred embodiment is effective particularly in the case of obtaining a wide beam.

In the preferred embodiment shown in FIG. 65, two of the polarizing portion shown in FIG. 63 are located at a central portion of the device, and two of the polarizing portion shown in FIG. 59 are located at opposite ends of the device. Further, a single common second prism formed plate 401 is located. With this construction, an overall volume of the device for obtaining the same cross section of an outgoing light beam as that in the preferred embodiment of FIGS. 62 and 63 can be reduced to about ½. Similarly, such an overall volume in comparison with the preferred embodiment of FIGS. 58 to 61 can be reduced to about 1/6. Further, as compared with a mere combination of the plural units shown in FIGS. 63 and 59, the number of parts can be reduced since the reflecting mirrors 407 are eliminated, and the prism formed plate 401 is commonly used.

In this manner, the constitutional elements to be arranged in a given width can be increased in number and reduced in thickness by reducing the thicknesses of the prism formed plates, the prism reflecting surfaces, the polarization beam splitters as far as the accuracy and the strength are permitted.

Figure 67:
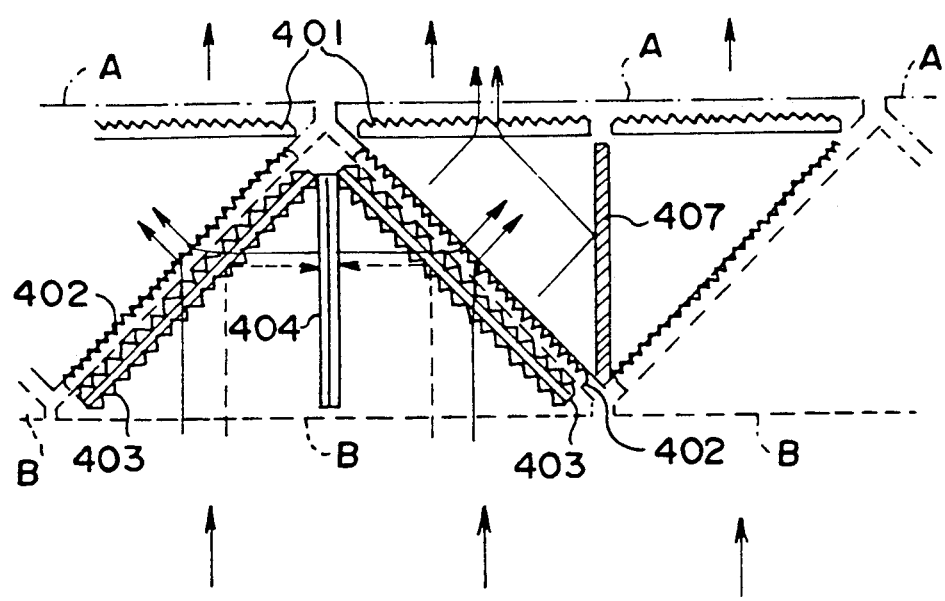
FIG. 67 is a plan view of an essential part of the polarization forming optical device according to the present invention.

FIG. 67 is a partial plan view of another preferred embodiment. In this preferred embodiment, a plurality of polarizing portions B and light beam synthesizing portions A are repeatedly arranged. Some examples of the polarizing portion B are shown in FIGS. 69A to 69F, and some examples of the light beam synthesizing portion A are shown in FIGS. 68A to 68D. In these drawings, the same parts as those of the previous preferred embodiments are designated by the same reference numerals.

Referring to FIGS. 69A to 69F, reference numeral 412 designates a ¼ wave plate, and reference numeral 413 designates a plane mirror. In the case that the combination of the ¼ wave plates and the plane mirror 413 is used, the plane mirror 413 may be replaced by a semi-transparent mirror, provided that optic axes of both the ¼ wave plates are made coincident. In this case, the two ¼ wave plates operate as a ½ wave plate as to a transmitted light.

Figure 68A:
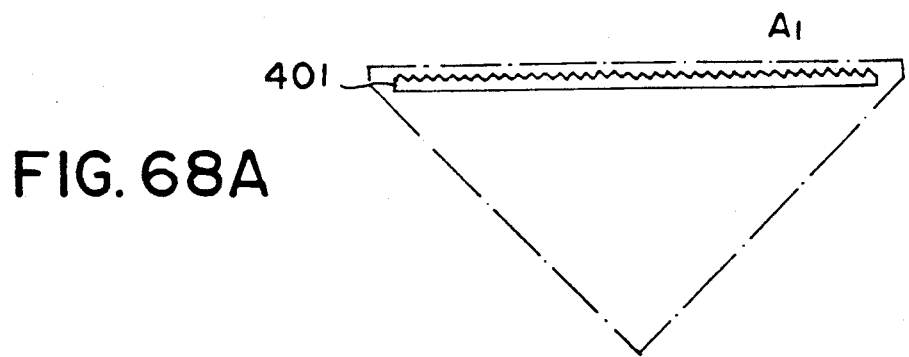
FIGS. 68A to 68D and 69A to 69F are plan views of some examples of a light beam synthesizing portion A and a polarizing portion B shown in FIG. 67.
Figure 68B:
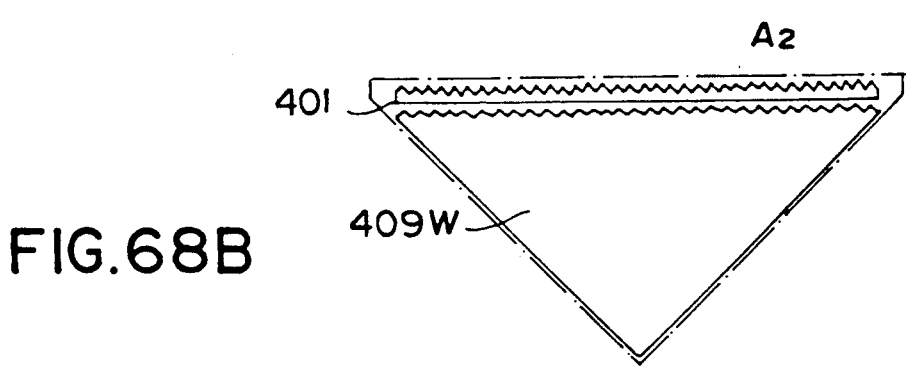
Figure 68C:
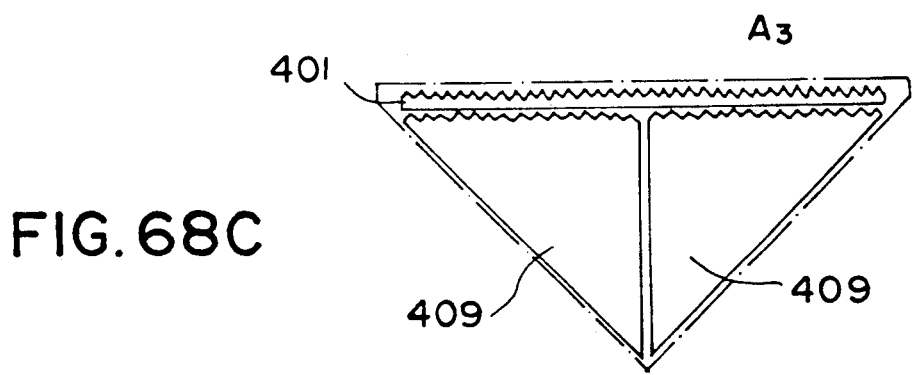
Figure 68D:
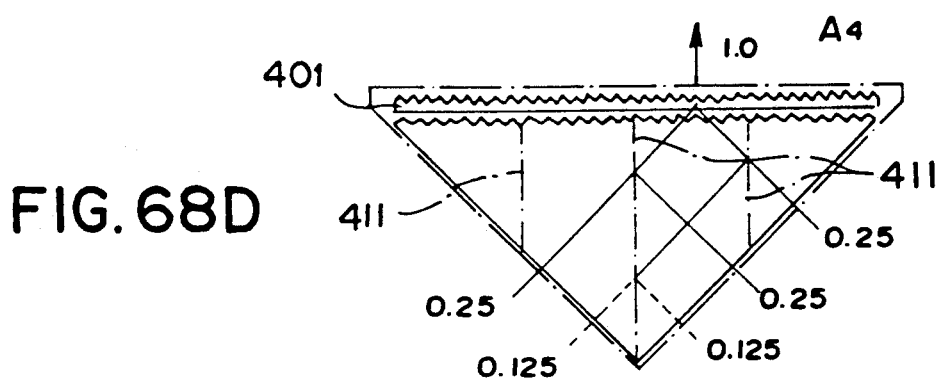
Figure 69A:
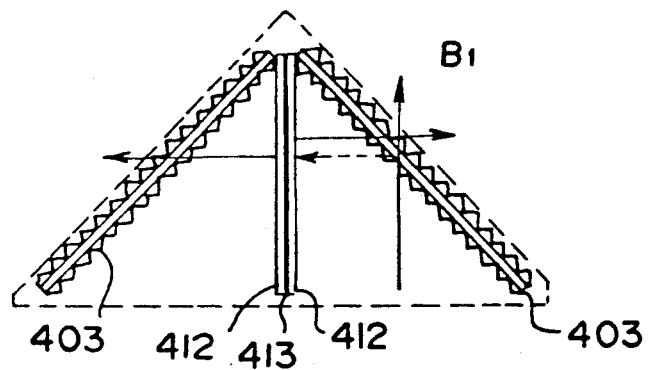
Figure 69B:
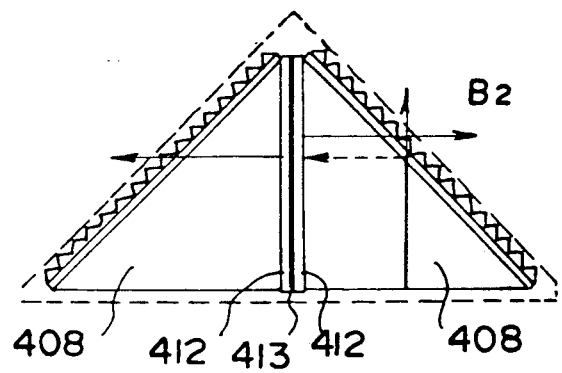
Figure 69C:
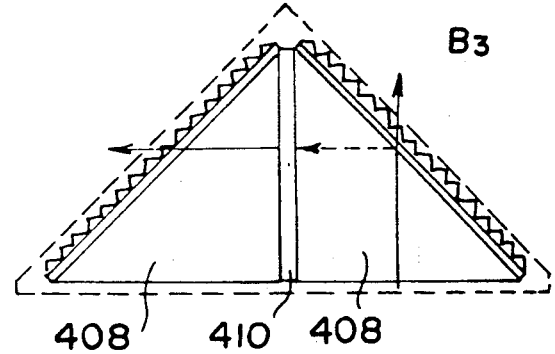
Figure 69D:
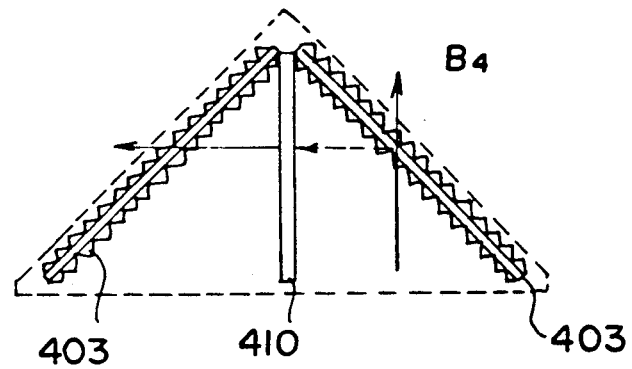
Figure 69E:
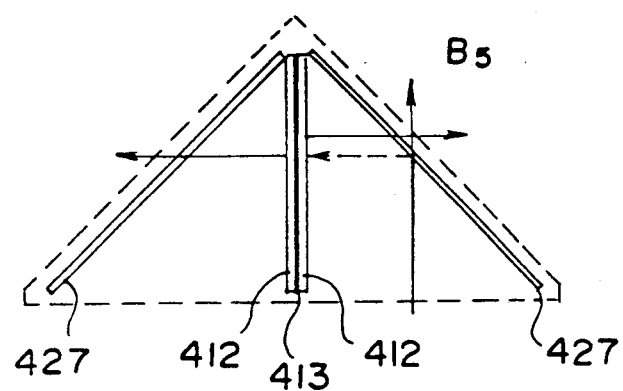
Figure 69F:
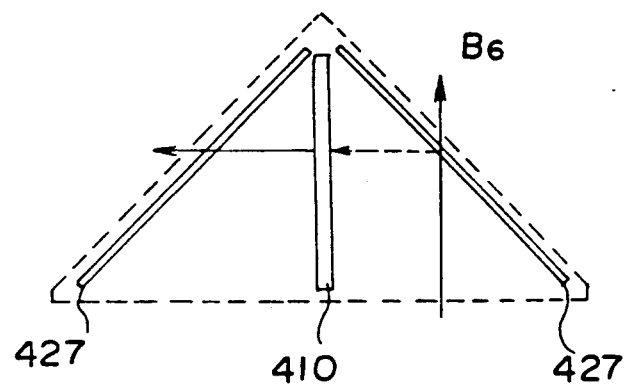

Referring to FIGS. 68A to 68D, reference numeral 409W designates a light conductor formed by integrating the two light conductors 409. In the examples of FIGS. 68A and 68B, the outgoing light beams from the adjacent polarizing portions are mixed to exhibit the mixing effect. In contrast, the example of FIG. 68C similar to FIG. 67 has no mixing function. In the example of FIG. 68D, a plurality of semi-transparent mirrors 411 are provided in the light conductor, so as to facilitate the mixing effect. As apparent from FIG. 68D, the outgoing light beams from different positions in the adjacent polarizing portions are mixed to generate a uniform outgoing light beam.

Figure 81:
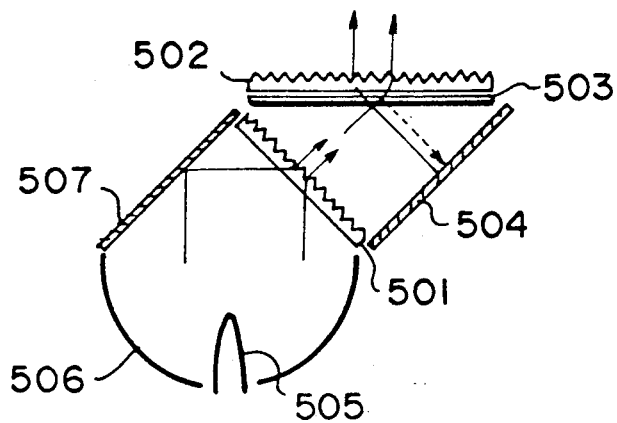
FIGS. 81 to 84 and 86 to 90 are plan views of the polarization forming optical device according to the present invention.
Figure 85:
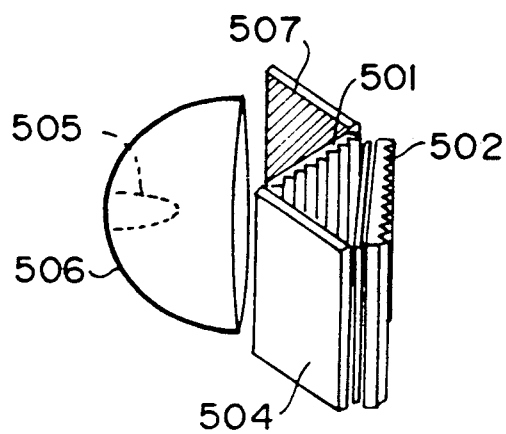
FIG. 85 is a perspective view of FIG. 81.

FIG. 81 is a plan view, and FIG. 85 is a perspective view of FIG. 81.

In the preferred embodiment of FIG. 81, rays of light from a light source 505 are made parallel by a curved mirror 506. A half portion of the parallel rays from the light source 505 enters the whole of a first prism formed plate 501 at an incident angle of 45°, and is then refracted by the first prism formed plate 501 to outgo therefrom. On the other hand, the other half portion of the parallel rays from the light source 505 enters the whole of a reflecting member 507 at an incident angle of 45°, and is reflected thereon to change an advancing direction at 90°. Then, the reflected light from the reflecting member 507 enters the whole of the first prism formed plate 501 at an incident angle of 45°, and is then refracted by the first prism formed plate 501 to outgo therefrom. The above two outgoing light beams can be made parallel by suitably selecting a shape and a refractive index of each small prism element of the first prism formed plate 501. A beam width of the outgoing light from the first prism formed plate 501 is reduced to $1/(2)^{\frac{1}{2}}$ of a beam width of the incident light from the light source 505. The first prism formed plate 501 and the reflecting member 507 constitute the light beam width reducing portion according to the present invention.

Then, the outgoing light beam from the first prism formed plate 501 enters a mirror type polarization beam splitter 503 at an incident angle of 45°. A p-polarization component of the incident light on the polarization beam splitter 503 is transmitted therethrough, and is then refracted by a second prism formed plate 502 to outgo therefrom. On the other hand, an s-polarization component of the incident light on the polarization beam splitter 503 is reflected thereon to enter a prism reflecting surface 504. Upon reflecting on the prism reflecting surface 504 in the opposite direction, a plane of polarization of the s-polarization component is rotated at 90° to obtain a p-polarized light which is in turn transmitted through the polarization beam splitter 503, and is then refracted by the second prism formed plate 502 to outgo therefrom. The above two outgoing light beams from the second prism formed plate 502 can be made parallel by suitably selecting a shape and a refractive index of each small prism element of the second prism formed plate 502. The polarization beam splitter 503, the prism reflecting surface 504 and the second prism formed plate 502 constitute the polarizing portion according to the present invention. While a beam width of the outgoing light from the polarizing the portion is expanded to $(2)^{\frac{1}{2}}$ of the beam width of the outgoing light from the light beam width reducing portion, the former is the same as the beam width of the incident light to the light beam width reducing portion.

Figure 86:
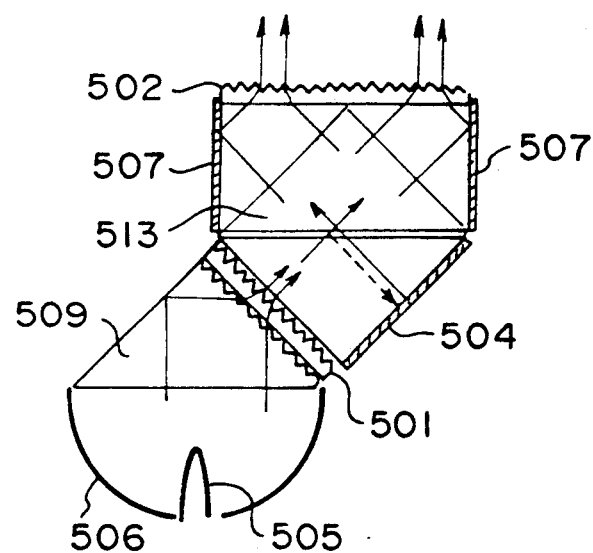

FIG. 86 is a plan view of a preferred embodiment. In this preferred embodiment, a prism type polarization beam splitter 513 is used in substitution for the mirror type polarization beam splitter 503 shown in FIG. 81, and two reflecting members 507 are provided. A half portion of an outgoing light from one of two outgoing surfaces of the prism type polarization beam splitter 513 is reflected on each reflecting member 507 to reach the second prism formed plate 502. With this construction, a beam width of the outgoing light from the polarizing portion can be made equal to that of the incident light to the light beam width reducing portion.

Further, in the light beam width reducing portion, a light conductor 509 of a rectangular prism having one side surface formed with a plurality of small rectangular prism elements arranged in rows is employed, and the other side surface of the rectangular prism is used as the reflecting member according to the present invention which is a total reflecting surface.

In the above two preferred embodiments shown in FIGS. 81 and 86, the prism reflecting surface 504 is used as the reflecting means according to the present invention. However, a phase plate may be located before the prism reflecting surface as the reflecting means, or a combination of a ¼ wave plate and a plane mirror may be used as the reflecting means.

Figure 83:
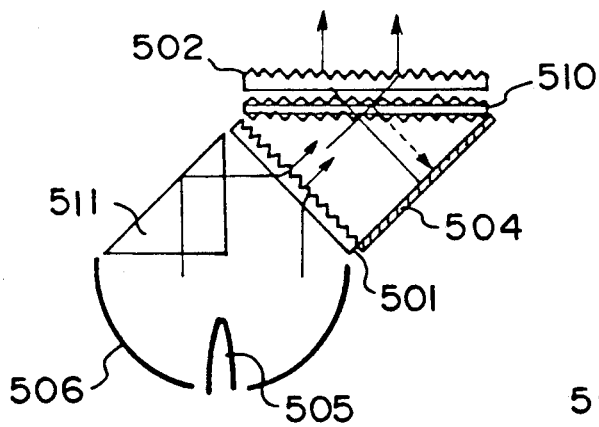
Figure 84:
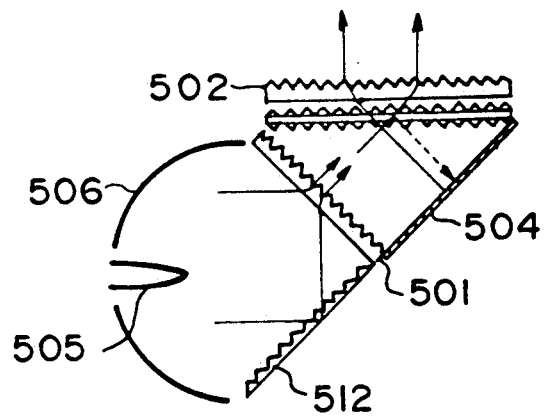

FIGS. 83 and 84 are plan views. In these preferred embodiments, a polarization beam splitter 510 is identical with the polarization beam splitter shown in FIG. 9.

In the preferred embodiment shown in FIG. 83, a slant surface of a rectangular prism 511 is used as the reflecting member in the light beam width reducing portion according to the present invention. In the preferred embodiment shown in FIG. 84, a trasparent plate 512 similar to that shown in FIG. 71 is used as the reflecting member in the light beam width reducing portion according to the present invention. In both the preferred embodiments, the prism 511 and the trasparent plate 512 have a refractive index of $(2)^{\frac{1}{2}}$ or more.

Figure 82:
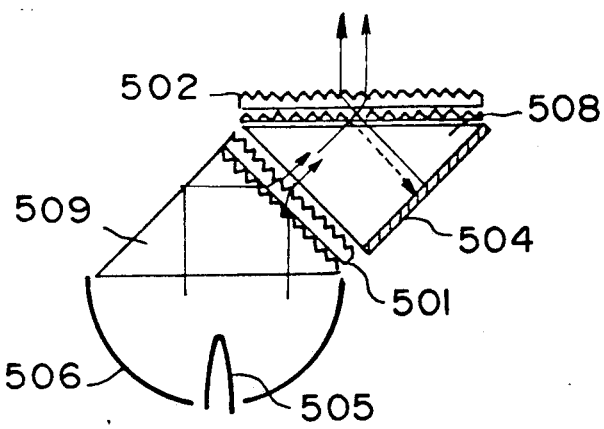

FIG. 82 is a plan view. In this preferred embodiment, a polarization beam splitter 508 is identical with the polarization beam splitter shown in FIG. 10.

As to a manner of transmission of light through the first prism formed plate 501 or the second prism formed plate 502, the previous explanation with reference to FIGS. 26A, 26B, 70 and 72 can be similarly applied.

Figure 87:
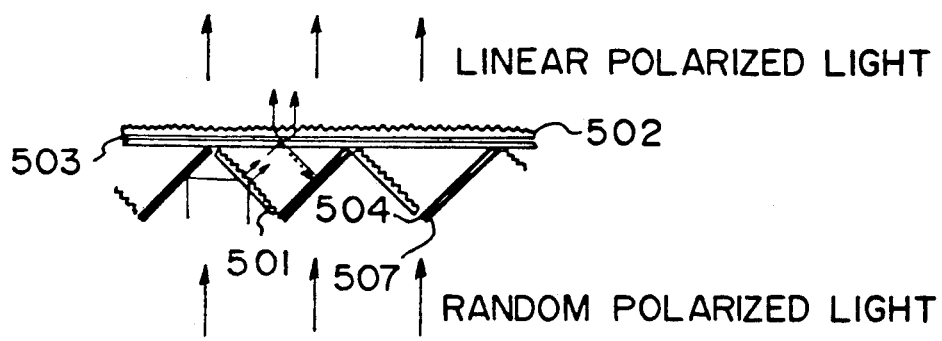

A preferred embodiment shown in FIG. 87 is realized by juxtaposing a plurality of the device shown in FIG. 81. In this preferred embodiment, a single second prism formed plate 502 and a single polarization beam splitter 503 are commonly used for the plural repeated units. Accordingly, a total volume of the device can be greatly reduced to thereby obtain a compact and lightweight device.

Figure 89:
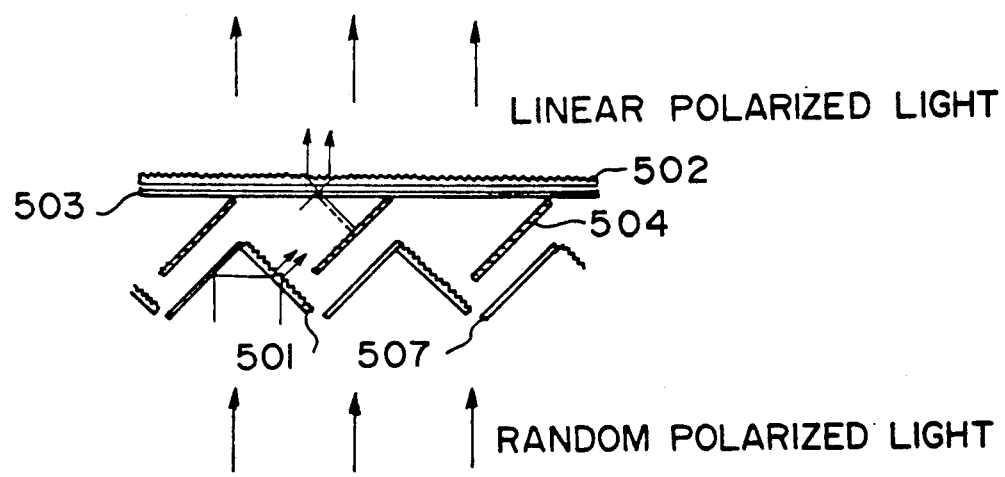

A preferred embodiment shown in FIG. 89 is realized by separating the light beam width reducing portion from the polarizing portion shown in FIG. 87.

Figure 88:
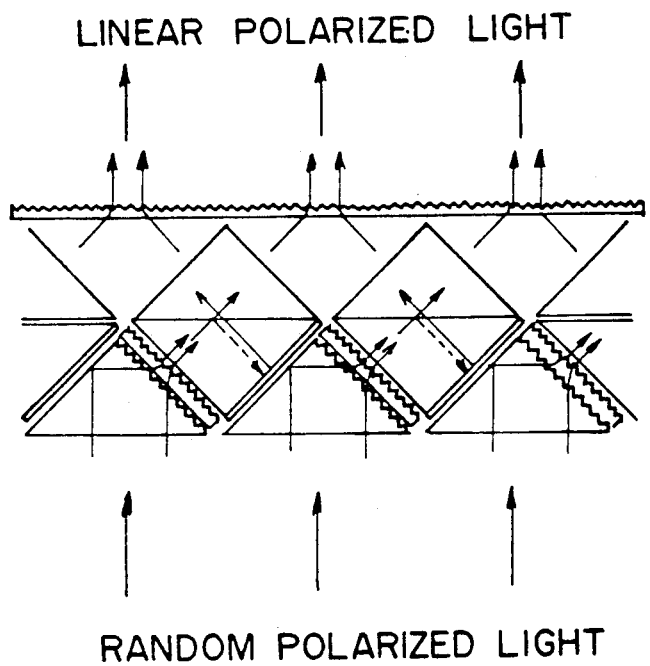

FIG. 88 is a plan view of a preferred embodiment. This preferred embodiment is realized by juxtaposing a plurality of the device shown in FIG. 86 and eliminating the reflecting members 507.

In the preferred embodiment shown in FIG. 88, a single second prism formed plate 502 is commonly used for the plural repeated units, so that different incident light beams to the plural light beam width reducing portions are synthesized by the single second prism formed plate 502.

Figure 90:
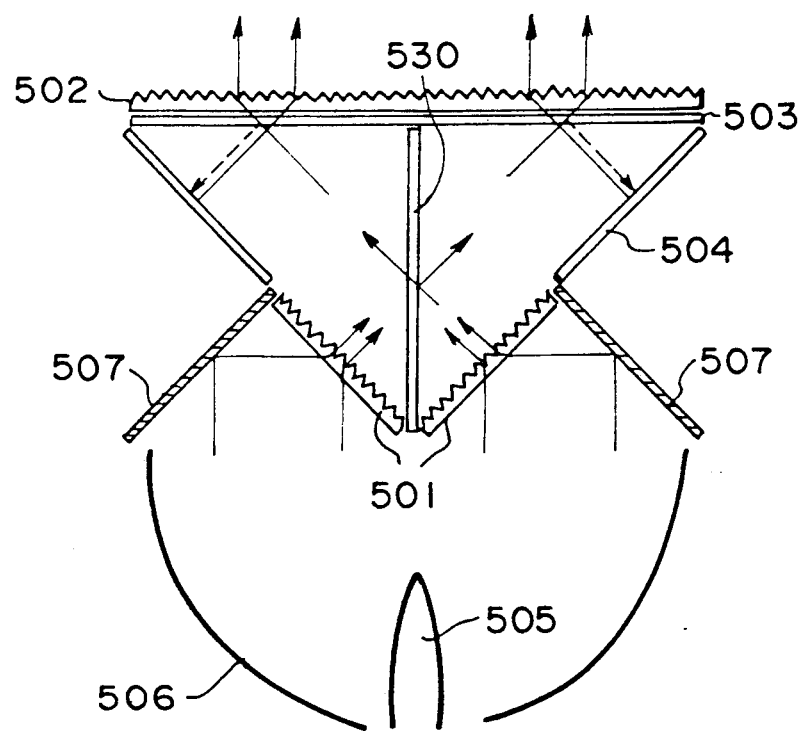

FIG. 90 is a plan view of a preferred embodiment. In this preferred embodiment, two of the light beam width reducing portion of the device shown in FIG. 81 are symmetrically juxtaposed in such a manner that the two first prism formed plates 501 are arranged adjacent to each other. Furthermore, a semi-transparent mirror 530 is located at a position of a symmetrical plane between the two first prism formed plates 501. Accordingly, an outgoing light from each first prism formed plate 501 enters each surface of the semi-transparent mirror 530, and a transmitted light and a reflected light from the semi-transparent mirror 530 on each side thereof are joined together to be conducted to the polarizing portion.

In this manner, the light beams from the two light beam width reducing portions are divided to reach the two polarizing portions. Therefore, even when there exists non-uniformity of brightness of the incident light to the right and left light beam width reducing portions from the light source 505 due to unsymmetry of the light source 505 or the curved mirror 506 with respect to the above-mentioned symmetrical plane (e.g., slippage of a position of a fillament of the light source 505 from the symmetrical plane to either a right side or a left side), such non-uniformity of brightness can be canceled to obtain an uniform outgoing light beam.

Although the light source employed in the above-mentioned preferred embodiments is a beam light source using a curved mirror, it is to be easily understood that a beam light source using a lens may be employed as the light source according to the present invention.

According to the present invention as described above, a linear polarized light can be efficiently formed from a random polarized light source by using a compact and simple device.

Further, a linear polarized light can be efficiently formed from a random polarized light source by using a compact and simple device as suppressing the expansion of a beam width and the generation of non-uniformity of brightness.

Further, a linear polarized light can be efficiently formed from a random polarized light source without expanding a beam width by using a compact and simple device.

What is claimed is:

1. A polarization forming optical device comprising:
a polarization beam splitter for reflecting one of an s-polarization component and a p-polarization component of light to be emitted from a light source and transmitting the other;
a prism reflecting surface for receiving one of a reflected light and a transmitted light from said polarization beam splitter and rotating a plane of polarization at 90° to obtain a reflected light component; and
means for deflecting the light advancing from said polarization beam splitter to said prism reflecting surface, the reflected light component from said prism reflecting surface, and/or the other of said reflected light and said transmitted light from said polarization beam splitter, so as to make an advancing direction of an outgoing light based on said reflected light from said polarization beam splitter coincident with an advancing direction of an outgoing light based on said transmitted light from said polarization beam splitter;
wherein said prism reflecting surface comprises a plurality of reflecting mirror surfaces, adjacent ones of which are perpendicular to each other, said reflecting mirror surfaces being arranged in rows in a direction perpendicular to a ridgeline formed between said adjacent reflecting mirror surfaces, said direction of arrangement of said rows of said reflecting mirror surfaces being inclined at 45° with respect to said plane of polarization of the incident light on said prism reflecting surface.

2. A polarization forming optical device as defined in claim 1, wherein said light source comprises a beam light source for emitting a random polarized light;
first and second polarization beam splitters are laid on an optical axis of said beam light source;
said first and second polarization beam splitters have reflecting surfaces inclined at 45° with respect to said optical axis of said beam light source and inclined at 90° with respect to each other; and
said prism reflecting surface is located behind said first and second polarization beam splitters so as to perpendicularly intersect said optical axis of said beam light source;
whereby assuming that Y-axis is parallel to said optical axis of said beam light source; X-axis is perpendicular to said Y-axis; X-Y plane is perpendicular to each said reflecting surface; and Z-axis is perpendicular to said X-Y plane, a light beam of said random polarized light from said beam light source is converted into a linear polarized light having a plane of polarization parallel to said X-Y plane to obtain a light beam outgoing in a direction parallel to said X-axis.

3. A polarization forming optical device as defined in claim 1, wherein said light source comprises a beam light source for emitting a random polarized light;
a single polarization beam splitter is laid on an optical axis of said beam light source;
a reflecting mirror is laid on said optical axis of said beam light source;
said polarization beam splitter has a reflecting surface inclined at 45° with respect to said optical axis of said beam light source;
said prism reflecting surface is located so that the reflected light from said reflecting surface of said polarization beam splitter enters perpendicularly to said prism reflecting surface; and
said reflecting mirror is inclined at 45° with respect to said optical axis of said beam light source and inclined at 90° with respect to said reflecting surface of said polarization beam splitter;
whereby assuming that Y-axis is parallel to said optical axis of said beam light source; X-axis is perpendicular to said Y-axis; X-Y plane is perpendicular to both said reflecting surface and said reflecting mirror; and Z-axis is perpendicular to said X-Y plane, a light beam of said random polarized light from said beam light source is converted into a linear polarized light having a plane of polarization parallel to X-Z plane to obtain a light beam outgoing in a direction parallel to said X-axis.

4. A polarization forming optical device as defined in claim 1, wherein said light source comprises a beam light source for emitting a random polarized light;
a first polarization beam splitter is laid on an optical axis of said beam light source and a second polarization beam splitter is laid on an optical path of a reflected light beam from said first polarization beam splitter;
said first and second polarization beam splitters have reflecting surfaces inclined at 45° with respect to an incident light beam thereon and inclined at 90° with respect to each other; and
said prism reflecting surface is located so that the reflected light from said reflecting surface of said second polarization beam splitter enters perpendicularly to said prism reflecting surface;
whereby assuming that X-axis is parallel to said optical axis of said beam light source; Y-axis is perpendicular to said X-axis; X-Y plane is perpendicular to each said reflecting surface; and Z-axis is perpendicular to said X-Y plane, a light beam of said random polarized light from said beam light source is converted into a linear polarized light having a plane of polarization parallel to X-Z plane to obtain a light beam outgoing in a direction parallel to said X-axis.

5. A polarization forming optical device as defined in claim 1, wherein said light source comprises a beam light source for emitting a random polarized light;
a single polarization beam splitter is laid on an optical axis of said beam light source;
said prism reflecting surface is laid on an optical path of a reflected light beam from said polarization beam splitter;

a reflecting mirror is laid on an optical path of a transmitted light beam through said polarization beam splitter after reflected on said prism reflecting surface;

said polarization beam splitter has a reflecting surface inclined at 45° with respect to an incident light beam thereon;

said reflecting mirror is inclined at 45° with respect to an incident light beam thereon;

said reflecting surface of said polarization beam splitter is inclined at 90° with respect to said reflecting mirror; and said prism reflecting surface is located so that the reflected light from said reflecting surface of said polarization beam splitter enters perpendicularly to said prism reflecting surface;

whereby assuming that X-axis is parallel to said optical axis of said beam light source; Y-axis is perpendicular to said X-axis; X-Y plane is perpendicular to each said reflecting surface; and Z-axis is perpendicular to said X-Y plane, a light beam of said random polarized light from said beam light source is converted into a linear polarized light having a plane of polarization parallel to X-Z plane to obtain a light beam outgoing in a direction parallel to said X-axis.

6. A polarization forming optical device comprising:

two polarization members, each said polarization member including:

a polarization beam splitter for reflecting one of an s-polarization component and a p-polarization component of light emitted from a light source and transmitting the other component;

a prism reflecting surface for receiving one of a reflected light and a transmitted light from said polarization beam splitter and rotating a plane of polarization at 90° to obtain a reflected light component; and means for deflecting the light advancing from said polarization beam splitter to said prism reflecting surface, the reflected light component from said prism reflecting surface, and/or the other of said reflected light and said transmitted light from said polarization beam splitter, so as to make an advancing direction of an ongoing light based on said transmitted light from said polarization beam splitter;

wherein said prism reflecting surface comprises a plurality of reflecting mirror surfaces, adjacent ones of which are perpendicular to each other, said reflecting mirror surfaces being arranged in rows in a direction perpendicular to a ridgeline formed between said adjacent reflecting mirror surfaces, said direction of arrangement of said rows of said reflecting surfaces being inclined at 45° with respect to said plane of polarization of the incident light on said prism deflecting surface;

wherein said light source comprises a beam light source for emitting a random polarized light, and a first polarization beam splitter is located on an optical axis of said beam light source and a second polarization beam splitter is located on an optical path of a reflected light beam from said first polarization beam splitter, said first and second polarization beam splitters having reflecting surfaces inclined at 45° with respect to an incident light beam thereon and inclined at 90° with respect to each other, and said prism reflecting surface is located so that the reflected light from said reflecting surface of said second polarization beam splitter enters perpendicularly to said prism reflecting surface, whereby assuming that X-axis is parallel to said optical axis of said beam light source, Y-axis is perpendicular to said X-axis, X-Y plane is perpendicular to each said reflecting surface, and Z-axis is perpendicular to said X-Y plane, a light beam of said random polarized light from said beam light source is converted into a linear polarized light having a plane of polarization parallel to X-Z plane to obtain a light beam outgoing in a direction parallel to said X-axis;

said two polarization members being combined together in symmetrical relationship with respect to said X-Z plane so that two of said first polarization beam splitter are located adjacent to each other, and said beam light source is commonly provided for said two members.

7. A polarization forming optical device comprising:

two polarization members, each said polarization member including:

a polarization beam splitter for reflecting one of an s-polarization component and a p-polarization component of light emitted from a light source and transmitting the other component;

a prism reflecting surface for receiving one of a reflected light and a transmitted light from said polarization beam splitter and rotating a plane of polarization at 90° to obtain a reflected light component; and means for deflecting the light advancing from said polarization beam splitter to said prism reflecting surface, the reflected light component from said prism reflecting surface, and/or the other of said reflected light and said transmitted light from said polarization beam splitter, so as to make an advancing direction of an ongoing light based on said transmitted light from said polarization beam splitter;

wherein said prism reflecting surface comprises a plurality of reflecting mirror surfaces, adjacent ones of which are perpendicular to each other, said reflecting mirror surfaces being arranged in rows in a direction perpendicular to a ridgeline formed between said adjacent reflecting mirror surfaces, said direction of arrangement of said rows of said reflecting surfaces being inclined at 45° with respect to said plane of polarization of the incident light on said prism deflecting surface;

wherein said light source comprises a beam light source for emitting a random polarized light, and a single polarization beam splitter is located on an optical axis of said beam light source, said prism reflecting surface being located on an optical path of a reflected light beam from said polarization beam splitter, a reflecting mirror being located on an optical path of a transmitted light beam through said polarized beam splitter after reflected on said prism reflecting surface, said polarization beam splitter having a reflecting surface inclined at 45° with respect to an incident light beam thereon, said reflecting mirror being inclined at 45° with respect to an incident light beam thereon, said reflecting surface of said polarized beam splitter being inclined at 90° with respect to said reflecting mirror, and said prism reflecting surface being located so that the reflected light from said reflecting surface of said polarization beam splitter enters perpendicularly to said prism reflecting surface, whereby assuming that X-axis is parallel to said optical axis of said beam light source, Y-axis is perpendicular to said X-axis, X-Y plane is perpendicular to each said reflecting surface, and Z-axis is perpendicular to said X-Y plane, a light beam of said random polarized light from said beam light source is converted into a linear polarized light having a plane of polarization parallel to X-Z plane to obtain a light beam outgoing in a direction parallel to said X-axis;

said two polarization members being combined together in symmetrical relationship with respect to said X-Z plane so that two of said prism reflecting surface are located adjacent to each other, and said beam light source is commonly provided for said two members.

8. A polarization forming optical device comprising:
a polarization beam splitter for reflecting one of a p-polarization component and an s-polarization component of light to be emitted from a light source and transmitting the other;
a prism reflecting surface for receiving a reflected light from said polarization beam splitter and rotating a plane of polarization at 90° to obtain a reflected light component; and
a prism for making an advancing direction of a transmitted light from said polarization beam splitter based on said reflected light component from said prism reflecting surface coincident with an advancing direction of a transmitted light from said polarization beam splitter based on an incident light directly from said light source;
wherein said prism reflecting surface comprises a plurality of reflecting mirror surfaces, adjacent ones of which are perpendicular to each other, said reflecting mirror surfaces being arranged in rows in a direction perpendicular to a ridgeline formed between said adjacent reflecting mirror surfaces, said direction of arrangement of said rows of said reflecting mirror surfaces being inclined at 45° with respect to said plane of polarization of the incident light on said prism reflecting surface.

9. A polarization forming optical device as defined in claim 8, wherein said light source comprises a beam light source for emitting a random polarized light;
said polarization beam splitter comprises a mirror type polarization beam splitter laid on an optical axis of said beam light source;
said prism comprises a prism formed plate located at a position where both said transmitted lights pass;
said prism formed plate is a transparent plate having one surface formed with a plurality of prism elements arranged in parallel rows and having the other surface which is planar;
each of said prism elements has two adjacent surfaces inclined at an angle $\theta$ with respect to a normal to said planar surface of said prism formed plate and inclined at an angle $2\theta$ with respect to each other, said prism elements having a refractive index n;
said prism formed plate is located in such a manner that said planar surface faces said polarization beam splitter, and that a ridgeline of said each prism element is perpendicular to an incident light to said each prism element; and said angle $\theta$ is related with an incident angle $\beta$ of an incident light from said beam light source to said polarization beam splitter so as to satisfy the following equation (1):

$$n \sin \alpha = \sin \beta$$

$$n \cos (\alpha + \theta) + \cos \theta \quad (1)$$

10. A polarization forming optical device as defined in claim 9, wherein said incident angle $\beta$ is 45°.

11. A polarization forming optical device as defined in claim 10, wherein said mirror type polarization beam splitter includes two transparent plates and a polarizing film interposed between said two transparent plates, each of said transparent plates being formed on its outer side surface with a plurality of prism elements arranged in parallel rows, each of said prism elements having two adjacent surfaces inclined at 45° with respect to a normal to an inner side surface of each said transparent plate and inclinded at 90° with respect to each other.

12. A polarization forming optical device as defined in claim 10, wherein said mirror type polarization beam splitter includes a single transparent plate, rectangular prism and a polarizing film interposed between an inner side surface of said transparent plate and a slant surface of said rectangular prism, said transparent plate being formed on its outer side surface with a plurality of prism elements arranged in parallel rows, each of said prism elements having two adjacent surfaces inclined at 45° with respect to a normal to said inner side surface of said transparent plate and inclined at 90° with respect to each other.

13. A polarization forming optical device as defined in claim 8, further comprising a phase plate located before said prism reflecting surface.

14. A polarization forming optical device comprising:
a first prism for dividing light to be emitted from a light source into two light beams;
a polarization beam splitter for reflecting one of a p-polarization component and an s-polarization component of each of said two light beams and transmitting the other;
a prism reflecting surface for receiving a reflected light from said polarization beam splitter and rotating a plane of polarization at 90° to obtain a reflected light component; and
a second prism for making an advancing direction of a transmitted light from said polarization beam splitter based on said reflected light component from said prism reflecting surface coincident with an advancing direction of a transmitted light from said polarization beam splitter based on an incident light directly from said first prism;
wherein said prism reflecting surface comprises a plurality of reflecting mirror surfaces, adjacent ones of which are perpendicular to each other, said reflecting mirror surfaces being arranged in rows in a direction perpendicular to a ridgeline formed between said adjacent reflecting mirror surfaces, said direction of arrangement of said rows of said reflecting mirror surfaces being inclined at 45° with respect to said plane of polarization of the incident light on said prism reflecting surface.

15. A polarization forming optical device as defined in claim 14, wherein said polarization beam splitter includes two transparent plates and a polarizing film interposed between said two transparent plates, each of said transparent plates being formed on its outer side surface with a plurality of prism elements arranged in parallel rows, each of said prism elements having two adjacent surfaces inclined at 45° with respect to a normal to an inner side surface of each said transparent plate and inclined at 90° with respect to each other.

16. A polarization forming optical device as defined in claim 14, further comprising a phase plate located before said prism reflecting surface.

17. A polarization forming optical device comprising:
a first prism for dividing light to be emitted from a light source into two light beams;
a polarization beam splitter for reflecting one of a p-polarization component and an s-polarization component of each of said two light beams and transmitting the other;
a prism reflecting surface for receiving a reflected light from said polarization beam splitter and rotating a plane of polarization at 90° to obtain a reflected light component; and
a second prism for making an advancing direction of a transmitted light from said polarization beam splitter based on said reflected light component from said prism reflecting surface coincident with an advancing direction of a transmitted light from said polarization beam splitter based on an incident light directly from said first prism;
one of said first prism and said second prism comprising a prism formed plate having one surface formed with a plurality of prism elements arranged in rows;
wherein said prism reflecting surface comprises a plurality of reflecting mirror surfaces, adjacent ones of which are perpendicular to each other, said reflecting mirror surfaces being arranged in rows in a direction perpendicular to a ridgeline formed between said adjacent reflecting mirror surfaces, said direction of arrangement of said rows of said reflecting mirror surfaces being inclined at 45° with respect to said plane of polarization of the incident light on said prism reflecting surface.

18. A polarization forming optical device comprising:
a polarizing film for reflecting one of a p-polarization component and an s-polarization component of light to be emitted from a light source and transmitting the other;
a prism reflecting surface for receiving a reflected light from said polarizing film and rotating a plane of polarization at 90° to obtain a reflected light component;
a reflecting mirror for changing an advancing direction of one of a transmitted light from said polarizing film based on said reflected light component from said prism reflecting surface and a transmitted light from said polarizing film based on an incident light directly from said light source in such a manner that both said transmitted lights intersect each other; and
a prism for making advancing directions of both said transmitted lights intersected coincident with each other to synthesize both said transmitted lights;
wherein said prism reflecting surface comprises a plurality of reflecting mirror surfaces, adjacent ones of which are perpendicular to each other, said reflecting mirror surfaces being arranged in rows in a direction perpendicular to a ridgeline formed between said adjacent reflecting mirror surfaces, said direction of arrangement of said rows of said reflecting mirror surfaces being inclined at 45° with respect to said plane of polarization of the incident light on said prism reflecting surface.

19. A polarization forming optical device as defined in claim 18, further comprising a phase plate located before said prism reflecting surface.

* * * * *